US011859994B1

(12) United States Patent
Jeong et al.

(10) Patent No.: US 11,859,994 B1
(45) Date of Patent: Jan. 2, 2024

(54) LANDMARK-BASED LOCALIZATION METHODS AND ARCHITECTURES FOR AN AUTONOMOUS VEHICLE

(71) Applicant: Aurora Innovation, Inc., Palo Alto, CA (US)

(72) Inventors: Yekeun Jeong, Sunnyvale, CA (US); Ethan Eade, Pittsburgh, PA (US); Adam Richard Williams, San Francisco, CA (US); Abhay Vardhan, Redwood City, CA (US); Nicholas George Dilip Roy, Needham, MA (US); James Andrew Bagnell, Pittsburgh, PA (US)

(73) Assignee: AURORA INNOVATION, INC., Palo Alto, CA (US)

( * ) Notice: Subject to any disclaimer, the term of this patent is extended or adjusted under 35 U.S.C. 154(b) by 208 days.

(21) Appl. No.: 17/178,534

(22) Filed: Feb. 18, 2021

(51) Int. Cl.
*G01C 21/36* (2006.01)
*G01S 17/89* (2020.01)
*G05D 1/02* (2020.01)

(52) U.S. Cl.
CPC .......... *G01C 21/3644* (2013.01); *G01S 17/89* (2013.01); *G05D 1/0214* (2013.01); *G05D 1/0231* (2013.01)

(58) Field of Classification Search
CPC .. G01C 21/3644; G01S 17/89; G05D 1/0214; G05D 1/0231
See application file for complete search history.

(56) References Cited

U.S. PATENT DOCUMENTS 9,719,801 B1* 8/2017 Ferguson ............ G01C 21/005
10,776,948 B1 9/2020 Parisotto et al.
(Continued)

FOREIGN PATENT DOCUMENTS

CN 103777220 5/2014
FR 2988201 9/2013
(Continued)

OTHER PUBLICATIONS

Thrun et al., "Probabilistic Robotics", Chapter 4.2, 492 pages.
Behley, J., & Stachniss, C. Efficient Surfel-Based SLAM Using 3D Laser Range Data in Urban Environments. Robotics: Science and Systems; (vol. 2018), 10 pages.
(Continued)

*Primary Examiner* — Anne Marie Antonucci
*Assistant Examiner* — Connor L Knight
(74) *Attorney, Agent, or Firm* — Gray Ice Higdon

(57) ABSTRACT

Systems and methods for landmark-based localization of an autonomous vehicle ("AV") are described herein. Implementations can generate a first predicted location of a landmark based on a pose instance of a pose of the AV and a stored location of the landmark, generate a second predicted location of the landmark relative to the AV based on an instance of LIDAR data, generate a correction instance based on the comparing, and use the correction instance in generating additional pose instance(s). Systems and methods for validating localization of a vehicle are also described herein. Implementations can obtain driving data from a past episode of locomotion of the vehicle, generate a pose-based predicted location of a landmark in an environment of the vehicle, and compare the pose-based predicted location to a stored location of the landmark in the environment of the vehicle to validate a pose instance of a pose of the vehicle.

20 Claims, 7 Drawing Sheets

(56) References Cited

U.S. PATENT DOCUMENTS

| | | | |
|---|---|---|---|
| 10,921,461 B2* | 2/2021 | Tan | G01S 19/49 |
| 2019/0041523 A1* | 2/2019 | Muramatsu | G01S 17/89 |
| 2019/0051056 A1 | 2/2019 | Chiu | |
| 2019/0138000 A1* | 5/2019 | Hammond | G05D 1/0212 |
| 2020/0004266 A1* | 1/2020 | Eoh | G05D 1/0276 |
| 2020/0264258 A1 | 8/2020 | Zhang | |
| 2022/0003855 A1* | 1/2022 | Zhu | G01S 7/4914 |
| 2022/0327737 A1* | 10/2022 | Wilhelm | G06V 20/64 |

FOREIGN PATENT DOCUMENTS

| | | |
|---|---|---|
| WO | 2017079219 | 5/2017 |
| WO | 2022051263 | 3/2022 |

OTHER PUBLICATIONS

Demantke J., Mallet C., David N. and Vallet B., Dimensionality Based Scale Selection in 3D Lidar Point Cloud. The International Archives of the Photogrammetry, Remote Sensing and Spatial Information Sciences, XXXVIII-5/W12, 97-102, 2011, 6 pages.
United States Patent and Trademark Office, Office Action issued in U.S. Appl. No. 17/124,070 dated Jul. 21, 2022, 46 pages.
Toledo et al.; Improving Odometric Accuracy for an Autonomous Electric Cart, MDPI, Jan. 12, 2018, 15 pages.
Badue et al.; Self-Driving Cars: A Survey, Oct. 2, 2019, 34 pages.
Yi et al.; Metrics for the Evaluation of localisation Robustness, Apr. 18, 2019, 7 pages.
Meng et al; A Robust Vehicle Localization Approach Based on GNSS/IMU/DMI/LiDAR Sensor Fusion for Autonomous Vehicles, Sep. 18, 2017, 19 pages.

\* cited by examiner

LANDMARK-BASED LOCALIZATION METHODS AND ARCHITECTURES FOR AN AUTONOMOUS VEHICLE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

Implementations of the present disclosure are directed to particular method(s) or architecture(s) for landmark-based localization of an autonomous vehicle (i.e., localization of the autonomous vehicle being autonomously controlled). Localization of the autonomous vehicle generally references determining a pose of the autonomous vehicle within its surrounding environment, and generally with respect to a particular frame of reference. Some implementations generate predicted locations of a given landmark, compare the predicted locations, and generate, based on the comparison, a correction instance for utilization in determining subsequent pose instance(s) of the pose of the autonomous vehicle. In some versions of those implementations, a LIDAR-based predicted location of the given landmark can be generated based on an instance of LIDAR data, and a pose-based predicted location of the given landmark can be generated based on a determined local pose instance of the autonomous vehicle and based on a stored mapping of the environment of the autonomous vehicle. The determined local pose instance can be generated without direct utilization of LIDAR data, without direct utilization of any sensor data that captures the given landmark, or without either. The correction instance to be utilized in determining a pose instance of the pose of the autonomous vehicle can be generated based on comparing the LIDAR-based predicted location of the given landmark and the pose-based predicted location of the given landmark.

Implementations of the present disclosure is additionally or alternatively directed to particular method(s) or architecture(s) for validating localization of an autonomous vehicle (i.e., localization of the autonomous vehicle being autonomously controlled) based on one or more landmarks. Some of those implementations obtain driving data from a past episode of locomotion of a vehicle (autonomous or otherwise), identify an instance of sensor data generated by sensor(s) of the vehicle, generated a pose-based predicted location of the landmark based on the instance of sensor data, compare the pose-based predicted location of the landmark to a stored location of the landmark, and validate a pose instance of a pose of the vehicle based on the comparing. Notably, the validating of the localization of the vehicle can be performed offline and subsequent to the past episode of locomotion. In some versions of those implementations, if an error determined based on the comparing satisfies an error threshold, then the pose instance of the pose of the vehicle may not be accurate, and parameter(s) of the sensor(s) can optionally be adjusted for subsequent episodes of locomotion of the vehicle. In some additional or alternative versions of those implementation, if the error determined based on the comparing does not satisfy the error threshold, then the pose instance of the pose of the vehicle may be validated as accurate.

Therefore, consistent with one aspect of the invention, a method for localization of an autonomous vehicle (AV) is described herein. The method may include generating a pose-based predicted location of a landmark relative to the AV. Generating the pose-based predicted location of the landmark relative to the AV may be based on: a local pose instance that defines a location of the AV within a mapping of an environment, and a stored location of the landmark within the mapping of the environment. The local pose instance may be generated without direct utilization of any LIDAR data from a LIDAR sensor of the AV. The method may further include generating a LIDAR-based predicted location of the landmark relative to the AV. Generating the LIDAR-based predicted location of the landmark relative to the AV may be based on identifying, in an instance of LIDAR data that temporally corresponds to the local pose instance, one or more features that are indicative of the landmark. The method may further include generating a correction instance based on comparing the pose-based predicted location and the LIDAR-based predicted location, and using the correction instance in generating an additional local pose instance, the additional local pose instance being generated without direct utilization of any LIDAR data from the LIDAR sensor.

These and other implementations of technology disclosed herein can optionally include one or more of the following features.

In some implementations, generating the pose-based predicted location of the landmark may include accessing the mapping of the environment of the AV, identifying the stored location of the landmark within the mapping of the environment, and determining, based on the local pose instance, and based on the stored location of the landmark within the mapping of the environment, the pose-based predicted location of the landmark in the environment of the AV.

In some implementations, the landmark may include a retroreflective surface, and the landmark may be one of: a curb, a road retroreflector, a pavement marker, a lane line, an entry point of an intersection, a lane divider, a roadway sign, a traffic light, a sign post, or a building. In some versions of those implementations, one or more of the features that are indicative of the landmark may include one or more saturated regions in the instance of the LIDAR data, and the one or more saturated regions may be caused by the retroreflective surface of the landmark. In some further versions of those implementations, generating the pose-based predicted location of the landmark may include accessing the mapping of the environment of the AV, identifying a previously stored point cloud from the mapping of the environment that includes the stored location of the landmark within the mapping, the stored location of the landmark including a stored saturated region caused by the retroreflective surface of the landmark from previous instances of LIDAR data that include the landmark, and determining, based on the local pose instance, and based on the stored saturated region in the previously stored point cloud, the pose-based predicted location of the landmark in the environment of the AV. In some further versions of those implementations, generating the LIDAR-based predicted location of the landmark in the environment of the AV may include assembling the instance of the LIDAR data that temporally corresponds to the local pose instance into one or more point clouds, identifying, in one or more of the point clouds, the one or more saturated regions caused by the retroreflective surface of the landmark, and determining, based on the one or more saturated regions in one or more of the point clouds, the LIDAR-based predicted location of the landmark in the environment of the AV. In yet further versions of those implementations, comparing the pose-based predicted location and the LIDAR-based predicted location may include determining an error in the local pose instance based on a difference between the LIDAR-based predicted location and the pose-based predicted location.

In even further versions of those implementations, the method may further include determining whether the error satisfies an error threshold, in response to determining that the error the local pose instance satisfies the error threshold, causing the AV to perform a controlled stop based on the additional local pose instance, and in response to determining that the error the local pose instance does not satisfy the error threshold, causing the AV to be controlled based on the additional local pose instance. In some additional or alternative versions of those implementations, the difference between the LIDAR-based predicted location and the pose-based predicted location may be a positional difference in n-dimensional space between the one or more saturated regions from the instance of the LIDAR data and the stored saturated region from the mapping, where the n-dimensional space may be a 2-dimensional space or a 3-dimensional space. In some further versions of those implementations, the correction instance may include an offset that may be based on the difference in the n-dimensional space between the one or more saturated regions from the instance of the LIDAR data and the stored saturated region from the mapping.

In some implementations, the method may further include determining an error in the local pose instance based on comparing the pose-based predicted location and the LIDAR-based predicted location, determining whether the error in the local pose instance satisfies an error threshold, and in response to determining that the error in the local pose instance satisfies the error threshold, causing the AV to perform a controlled stop based on the additional local pose instance.

In some implementations, the method may further include identifying a historical pose-based predicted location of the landmark relative to the AV. The historical pose-based predicted location may have been generated based on a previous local pose instance that defines a previous location of the AV within the mapping of the environment, and the stored location of the landmark within the mapping of the environment. The method may further include identifying a historical LIDAR-based predicted location of the landmark relative to the AV. The historical LIDAR-based predicted location may have been generated based on identifying, in a previous instance of the LIDAR data that temporally corresponds to the previous local pose instance, one or more of the features that are indicative of the landmark. Generating the correction instance may be further based on comparing the local historical pose-based predicted location and the historical LIDAR-based predicted location.

Consistent with another aspect of the invention, a method for localization of an autonomous vehicle (AV) is described herein. The method may include, by one or more primary control system processors of a primary control system, determining a first predicted location of a landmark in an environment of the AV, determining a second predicted location of the landmark in the environment of the AV, generating a correction instance based on comparing the first predicted location of the landmark and the second predicted location of the landmark, and transmitting the correction instance to a secondary control system. Determining the first predicted location of the landmark may be based on a first sensor data instance of first sensor data that is generated by one or more first sensors of the AV. Determining the second predicted location of the landmark may be based on a determined local pose instance of a local pose of the AV and a stored location, of the landmark, in a stored mapping of the environment. The determined local pose instance may be generated based on a second sensor data instance of second sensor data that is generated by one or more second sensors of the AV. The second sensor data instance used to determine the local pose instance may temporally correspond to the first sensor data instance used to determine the first predicted location of the landmark. The method may further include, by one or more secondary control system processors of the secondary control system, receiving the correction instance, and generating an additional local pose instance of the AV based on the correction instance and based on an additional second sensor data instance of the second sensor data.

These and other implementations of technology disclosed herein can optionally include one or more of the following features.

In some implementations, the one or more first sensors may include at least a LIDAR sensor, and the first sensor data instance may include at least an instance of LIDAR data generated by a sensing cycle of the LIDAR sensor of the AV.

In some versions of those implementations, the landmark may include a retroreflective surface, and the instance of the LIDAR data may include one or more saturated regions caused by the retroreflective surface of the landmark. In some further versions of those implementations, determining the first predicted location of the landmark in the environment of the AV may include assembling the instance of the LIDAR data into one or more point clouds, identifying, in one or more of the point clouds, a location in the one or more saturated regions caused by the retroreflective surface of the landmark, and determining, based on the location of the one or more saturated regions in one or more of the point clouds, the first predicted location of the landmark in the environment of the AV. In yet further versions of those implementations, comparing the first predicted location of the landmark and the second predicted location of the landmark may include determining a positional difference in n-dimensional space between the one or more saturated regions from the LIDAR data and the stored location of the landmark, where the n-dimensional space is a 2-dimensional space or a 3-dimensional space, and determining an error in the determined local pose instance based on the positional difference in the n-dimensional space.

In some additional or alternative versions of those implementations, determining the first predicted location of the landmark in the environment of the AV may include generating a global pose instance of a global pose of the AV. Generating the global pose instance may include assembling the instance of the LIDAR data into one or more point clouds, aligning, using a geometric matching technique, one or more of the point clouds with a previously stored point cloud associated with the local pose instance determined based on the second sensor data instance that temporally corresponds to the first sensor data instance, and determining, based on the global pose instance, the first predicted location of the landmark in the environment of the AV.

In some implementations, the landmark may include a retroreflective surface, and the landmark may be one of: a curb, a pavement marker, a road retroreflector, a lane line, an entry point of an intersection, a lane divider, a roadway sign, a traffic light, a sign post, or a building.

Consistent with yet another aspect of the invention, a method for validating localization of an autonomous vehicle (AV) is described herein. The method may include obtaining driving data corresponding to a past episode of locomotion of the vehicle, identifying, from the driving data corresponding to the past episode, a sensor data instance generated by one or more sensors of the vehicle during the past episode, generating, based on the sensor data instance, a pose-based predicted location of a landmark in an environment of the vehicle, identifying, from a stored mapping of the environment of the vehicle, a stored location of the landmark in the environment of the vehicle, comparing the pose-based predicted location of the landmark to the stored location of the landmark, and validating, based on the comparing the pose-based predicted location of the landmark to the stored location of the landmark, a pose instance of a pose of the vehicle, the pose instance being generated during the past episode and based on the sensor data instance.

These and other implementations of technology disclosed herein can optionally include one or more of the following features.

In some implementations, validating the pose instance of the pose of the vehicle generated during the past episode may include determining, based on comparing the pose-based predicted location of the landmark to the stored location of the landmark, an error between the pose-based predicted location of the landmark and the stored location of the landmark, and determining whether the error between the pose-based predicted location of the landmark and the stored location of the landmark satisfies an error threshold.

In some versions of those implementations, the method may further include, in response to determining that the error between the pose-based predicted location of the landmark and the stored location of the landmark satisfies the error threshold, classifying the pose instance of the pose of the vehicle generated during the past episode as not accurate, and adjusting one or more corresponding parameters of one or more of the sensors of the vehicle. In some further versions of those implementations, adjusting one or more of the corresponding parameters of one or more of the sensors of the vehicle may include automatically adjusting, based on the error, one or more of the corresponding parameters of one or more of the sensors of the vehicle. In some additional or alternative versions of those further implementations, adjusting one or more of the corresponding parameters of one or more of the sensors of the vehicle may include adjusting, based on user input received responsive to the error satisfying the error threshold, one or more of the corresponding parameters of one or more of the sensors of the vehicle. In some additional or alternative versions of those further implementations, the method may further include using the one or more adjusted corresponding parameters of one or more of the sensors of the vehicle during a subsequent episode of locomotion of the vehicle.

In some additional or alternative versions of those implementations, the method may further include in response to determining that the error between the pose-based predicted location of the landmark and the stored location of the landmark does not satisfy the error threshold: classifying the pose instance of the pose of the vehicle generated during the past episode as accurate.

In some implementations, the one or more sensors may include at least a LIDAR sensor, and the sensor data instance may include an instance of LIDAR data generated by a sensing cycle of the LIDAR sensor of the vehicle.

In some versions of those implementations, the landmark may include a retroreflective surface that is indicative of the landmark, and the instance of the LIDAR data may include one or more saturated regions caused by the retroreflective surface of the landmark. In some further versions of those implementations, identifying the stored location of the landmark in the environment of the vehicle from the stored mapping of the environment of the vehicle may include identifying one or more stored saturated regions caused by the retroreflective surface of the landmark. In yet further versions of those implementations, comparing the pose-based predicted location of the landmark to the stored location of the landmark may include comparing one or more of the saturated regions captured in the instance of the LIDAR data to one or more of the stored saturated regions.

In some additional or alternative versions of those implementations, generating the pose-based predicted location of the landmark may be based on identifying, in the instance of the LIDAR data, the retroreflective surface that is indicative of the landmark.

In some implementations, the one or more sensors may include at least one or more IMU sensors and one or more wheel encoder sensors, and the sensor data instance may include an instance of IMU data generated by one or more of the IMU sensors of the vehicle and an instance of wheel encoder data generated by one or more of the wheel encoder sensors. In some versions of those implementations, generating the pose-based predicted location of the landmark may be based on the pose instance of the vehicle generated based on the sensor data instance, and the stored location of the landmark within the mapping of the environment.

In addition, some implementations include one or more processors (e.g., one or more of central processing unit(s) (CPU(s)), graphics processing unit(s) (GPU(s)), or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 7 is flowchart illustrating an example method for offline validation of localization of a vehicle, in accordance with various implementations.

DETAILED DESCRIPTION

Figure 1:
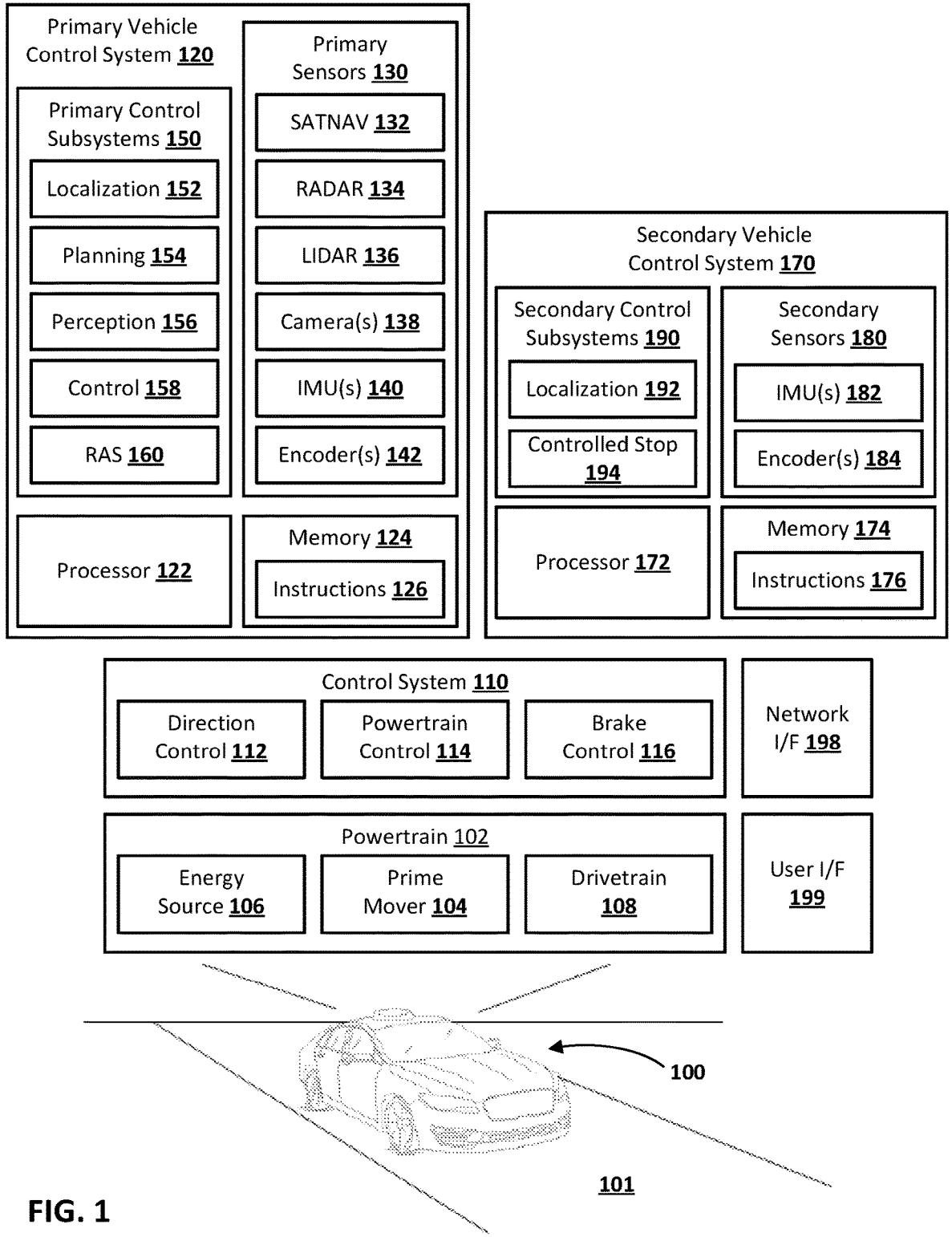
FIG. 1 illustrates an example hardware and software environment for an autonomous vehicle, in accordance with various implementations.

In various implementations, localization of an autonomous vehicle includes generating both a first predicted location of a given landmark in an environment of the autonomous vehicle and a second predicted location of the given landmark. Local pose instances of a local pose of the autonomous vehicle can be generated based at least in part on comparing the predicted locations of the given landmark. In some versions of those implementations, the local pose instances are utilized at least part of the time (e.g., the majority of the time or even exclusively) as the localization that is used in control of the autonomous vehicle. The given landmark can include any object or surface in an environment of the autonomous vehicle that is relatively static and that can be reliably detected by one or more sensors of the autonomous vehicle. For example, the given landmark can include a curb, a road retroreflector, a pavement marker, a lane line, an entry point of an intersection, a lane divider, a roadway sign, a traffic light, a sign post, a building, or any other object or surface that can be reliably detected be reliably detected one or more of the sensors of the autonomous vehicle. The landmark can optionally include a retroreflective surface.

The first predicted location of the given landmark in the environment of the autonomous vehicle can be generated based on an instance of LIDAR data generated by one or more LIDAR sensors of the autonomous vehicle. Accordingly, the first predicted location is sometimes referred to herein as a LIDAR-based predicted location of the given landmark. In implementations where the given landmark includes the retroreflective surface, a sensing cycle of one or more of the LIDAR sensors of the autonomous vehicle can include features that are indicative of the given landmark. For example, the autonomous vehicle can identify one or more saturated regions caused by the retroreflective surface of the given landmark, and a location associated with the one or more saturated regions can be utilized as the LIDAR-based predicted location of the autonomous vehicle.

The second predicted location of the given landmark in the environment of the autonomous vehicle can be generated based on a determined local pose instance of the local pose of the autonomous vehicle and based on a stored mapping of the environment that includes a stored location of the given landmark. Accordingly, the second predicted location is sometimes referred to herein as a pose-based predicted location of the given landmark. Notably, the pose-based predicted location of the given landmark is generated based on non-vision sensor data. For example, the local pose instance of the autonomous vehicle can be generated based instances on IMU data generate by IMU(s) of the autonomous vehicle, wheel encoder data generated by wheel encoder(s) of the autonomous vehicle, any other non-vision-based sensor data, or any combination thereof. Accordingly, the resulting pose-based predicted location of the given landmark are also generated based on instances of non-vision-based sensor data.

In some implementations, the stored location of the given landmark can include positional coordinates of the given landmark within the mapping of the environment of the autonomous vehicle. For example, the stored location of the given landmark can indicate that the given landmark is located at X1, Y1, and Z1 within the mapping of the environment of the autonomous vehicle. In some additional or alternative implementations where the landmark includes the retroreflective surface, the stored location of the given landmark can include a previously stored point cloud that includes one or more saturated regions caused by the retroreflective surface of the given landmark when mapping the environment of the autonomous vehicle. Moreover, the determined local pose instance can be generated based on an instance of second sensor data generated by second sensors of the autonomous vehicle. Further, the instance of the second sensor data may temporally correspond to the instance of the LIDAR data utilized in generating the first predicted location of the given landmark. Thus, assuming the local pose instances are accurate, there should be no difference between the first predicted location of the given landmark and the second predicted location of the given landmark. Accordingly, any difference between these predicted locations can be utilized in generating the correction instance for use in generating additional local pose instances of the autonomous vehicle.

In various implementations, validating localization of a vehicle (an autonomous vehicle or non-autonomous vehicle retrofitted with sufficient sensors) includes generating a pose-based predicted location of a given landmark in an environment of the autonomous vehicle based on an instance of sensor data generated by sensor(s) of the vehicle. The instance of the sensor data can include a LIDAR data instance generated by LIDAR sensor(s) of the vehicle, a wheel encoder data instance generated by wheel encoder(s) of the vehicle, an IMU data instance generated by IMU(s) of the vehicle, or any combination thereof. The pose-based predicted location of the landmark can be compared to a stored location of the landmark that is stored in a previous mapping of the environment of the vehicle. An error between the pose-based predicted location of the landmark and the stored location of the landmark can be determined. The error can indicate whether a pose instance of a pose of the vehicle, that is generated based on at least the sensor data instance utilized in generating the pose-based predicted location of the landmark, is accurate. For example, if the error fails to satisfy an error threshold, then the pose instance of the pose of the vehicle may be classified as accurate. However, if the error satisfies the error threshold, then the pose instance of the pose of the vehicle may be classified as not accurate. Further, parameter(s) of the sensor(s) of the vehicle can be automatically adjusted, or adjusted based on user input received responsive to determining that the pose instance of the pose of the vehicle is not accurate, and the adjusted parameter(s) of the sensor(s) can be utilized by the vehicle (and optionally other vehicles) in subsequent episodes of locomotion.

As used herein, the term "tile" refers to a previously mapped portion of a geographical area. A plurality of tiles can be stored in memory of various systems described herein, and the plurality of tiles can be used to represent a geographical region. For example, a given geographical region, such as a city, can be divided into a plurality of tiles (e.g., each square mile of the city, each square kilometer of the city, or other dimensions), and each of the tiles can represent a portion of the geographical region. Further, the tiles can be stored in database(s) that are accessible by various systems described herein, and the tiles can be indexed in the database(s) by their respective locations within the geographical region. Moreover, the tiles can include, for example, information contained within the tiles, such as intersection information, traffic light information, landmark information, street information, other information for the geographical area represented by the tiles, or any combination thereof. The information contained within the tiles can be utilized to identify a matching tile.

As used herein, the term "pose" refers to location information and orientation information of an autonomous vehicle within its surroundings, and generally with respect to a particular frame of reference. The pose can be an n-dimensional representation of the autonomous vehicle within the frame of reference, such any 2D, 3D, 4D, 5D, 6D, or any other dimensional representation. The particular frame of reference can be, for example, based on the aforementioned tile(s), longitude and latitude coordinates, a relative coordinate system, other frame(s) of reference, or any combination thereof. Moreover, various types of poses are described herein, and different types of poses can be defined with respect different frame(s) of reference. For example, a "global pose" of the autonomous vehicle can refer to location information and orientation information of the autonomous vehicles with respect to tile(s), and can be generated based on at least an instance of first sensor data generated by first sensor(s) of an autonomous vehicle. Further, a "local pose" of the autonomous vehicle can refer to location information and orientation information of the autonomous vehicles with respect to tile(s), but can be generated based on at least an instance of second sensor data generated by second sensor(s) of an autonomous vehicle that exclude the first sensor(s) utilized in generating the global pose.

As used herein, the term "online" refers to operation that are performed during an episode of locomotion by a vehicle (an autonomous vehicle or non-autonomous vehicle retrofitted with sufficient sensors). These operations can be performed locally at the vehicle, or remotely by a computer system in communication with the vehicle. Further, these operations may influence control of the vehicle during the episode of locomotion. As used herein, the term "offline" refers to operations that do not influence control of the vehicle during the episode of locomotion. These operations can be performed locally at the vehicle, but are generally performed remotely by a computer system based on driving data generated during a past episode of locomotion.

Prior to further discussion of these and other implementations, however, an example hardware and software environment within which the various techniques disclosed herein may be implemented will be discussed.

Turning to the drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114, and a brake control 116. Vehicle 100 may be implemented as any number of different types of vehicles, including vehicles capable of transporting people or cargo, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels or tires (or both) along with a transmission or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In various implementations, different combinations of powertrains 102 and energy sources 106 may be used. In the case of electric/gas hybrid vehicle implementations, one or more electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

Direction control 112 may include one or more actuators or sensors (or both) for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed or direction (or both) of the vehicle. Brake control 116 may be configured to control one or more brakes that slow or stop vehicle 100, e.g., disk or drum brakes coupled to the wheels of the vehicle.

Other vehicle types, including but not limited off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations, various components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include processor(s) 122 and one or more memories 124, with the processor(s) 122 configured to execute program code instruction(s) 126 stored in memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. A Radio Detection and Ranging (RADAR) sensor 134 and a Light Detection and Ranging (LIDAR) sensor 136, as well as digital camera(s) 138 (which may include various types of image capture devices capable of capturing still and video imagery), may be used to sense stationary and moving objects within the immediate vicinity of a vehicle. Inertial measurement unit(s) (IMU(s)) 140 may include multiple gyroscopes and accelerometers capable of detection linear and rotational motion of vehicle 100 in three directions, while wheel encoder(s) 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, a control subsystem 158, and a mapping subsystem 160. Localization subsystem 152 determines a "pose" of vehicle 100. In some implementations, the pose can include the location information and orientation information of vehicle 100. In some of those implementations, the pose can additionally velocity information of vehicle 100, acceleration information of vehicle 100, or both. More particularly, localization subsystem 152 generates a "global pose" of vehicle 100 within its surrounding environment, and with respect to a particular frame of reference. As discussed in greater detail herein, localization subsystem 152 can generate a global pose of vehicle 100 based on matching sensor data output by one or more of sensors 132-142 to a previously mapped portion of a geographical area (also referred to herein as a "tile"). In some additional or alternative implementations, localization subsystem 152 determines predicted location(s) of landmark(s) within the surrounding environment of vehicle 100.

Planning subsystem 154 plans a path of motion for vehicle 100 over a timeframe given a desired destination as well as the static and moving objects within the environment, while perception subsystem 156 detects, tracks, and identifies elements within the environment surrounding vehicle 100. Control subsystem 158 generates suitable control signals for controlling the various controls in control system 110 in order to implement the planned path of the vehicle. Mapping subsystem 160 may be provided in the illustrated implementations to describe the elements within an environment and the relationships therebetween, and may be accessed by one or more of the localization, planning, and perception subsystems 152-156 to obtain various information about the environment for use in performing their respective functions.

Vehicle 100 also includes a secondary vehicle control system 170, which may include one or more processors 172 and one or more memories 174 capable of storing program code instruction(s) 176 for execution by processor(s) 172, and be substantially similar to the primary vehicle control system 120. In some implementations, secondary vehicle control system 170, may be used in conjunction with primary vehicle control system 120 in normal operation of vehicle 100. In some additional or alternative implementations, secondary vehicle control system 170, may be used as a redundant or backup control system for vehicle 100, and may be used, among other purposes, to continue planning and navigation, to perform controlled stops in response to adverse events detected in primary vehicle control system 120, or both. Adverse events can include, for example, a detected hardware failure in vehicle control systems 120, 170, a detected software failure in vehicle control systems 120, 170, a detected failure of sensor systems 130, 180, other adverse events, or any combination thereof. In other words, the adverse events can include failure of subsystems 150, 190, sensors 130, 180, and other failures.

Secondary vehicle control system 170 may also include a secondary sensor system 180 including various sensors used by secondary vehicle control system 170 to sense the conditions or surroundings of vehicle 100. For example, IMU(s) 182 may be used to generate linear and rotational motion information about the vehicle, while wheel encoder(s) 184 may be used to sense the velocity of each wheel. One or more of IMU(s) 182 and wheel encoder(s) 184 of secondary sensor system 180 may be the same as or distinct from one or more of IMU(s) 140 and wheel encoder(s) 142 of the primary sensor system 130.

Further, secondary vehicle control system 170 may also include secondary control subsystems 190, including at least localization subsystem 192 and controlled stop subsystem 194. Localization subsystem 192 generates a "local pose" of vehicle 100 relative to a previous local pose of vehicle 100. As discussed in greater detail herein, localization subsystem 152 can generate local pose of vehicle 100 by processing sensor data output by one or more of sensors 182-184 to generate the local pose of vehicle 100. Controlled stop subsystem 194 is used to implement a controlled stop for vehicle 100 upon detection of an adverse event. Other sensors and subsystems that may be utilized in secondary vehicle control system 170, as well as other variations capable of being implemented in other implementations, will be discussed in greater detail below.

Notably, localization subsystem 152, which is responsible for generating a global pose of vehicle 100 (e.g., implemented by processor(s) 122), and localization subsystem 192, which is responsible for generating a local pose of vehicle 100 (e.g., implemented by processor(s) 172), are depicted as being implemented by separate hardware components. As discussed in greater detail below, localization subsystem 192 can generate instances of local pose of vehicle 100 at a faster rate than localization subsystem 152 can generate instances of global pose of vehicle 100. As a result, multiple instances of a local pose of vehicle 100 can be generated in the same amount of time as a single instance of global pose of vehicle 100.

In general, it should be understood an innumerable number of different architectures, including various combinations of software, hardware, circuit logic, sensors, networks, etc. may be used to implement the various components illustrated in FIG. 1. The processor(s) 122, 172 may be implemented, for example, as a microprocessor and the memory 124, 174 may represent the random access memory (RAM) devices comprising a main storage, as well as any supplemental levels of memory, e.g., cache memories, non-volatile or backup memories (e.g., programmable or flash memories), read-only memories, etc. In addition, the memory 124, 174 may be considered to include memory storage physically located elsewhere in vehicle 100 (e.g., any cache memory in processor(s) 122, 172), as well as any storage capacity used as a virtual memory (e.g., as stored on a mass storage device or on another computer or controller). Processor(s) 124, 174 illustrated in FIG. 1, or entirely separate processors, may be used to implement additional functionality in vehicle 100 outside of the purposes of autonomous control (e.g., to control entertainment systems, to operate doors, lights, convenience features, and so on).

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, or a tape drive, among others. Furthermore, vehicle 100 may include a user interface 199 to enable vehicle 100 to receive a number of inputs from and generate outputs for a user or operator (e.g., using one or more displays, touchscreens, voice interfaces, gesture interfaces, buttons and other tactile controls, or other input/output devices). Otherwise, user input may be received via another computer or electronic device (e.g., via an app on a mobile device) or via a web interface (e.g., from a remote operator).

Moreover, vehicle 100 may include one or more network interfaces 198 suitable for communicating with one or more networks (e.g., a LAN, a WAN, a wired network, a wireless network, or the Internet, among others) to permit the communication of information between various components of vehicle 100 (e.g., between powertrain 102, control system 110, primary vehicle control system 120, secondary vehicle control system 170, other systems or components, or any combination thereof), with other vehicles, computers or electronic devices, including, for example, a central service, such as a cloud service, from which vehicle 100 receives environmental and other data for use in autonomous control thereof. For example, vehicle 100 may be in communication with a cloud-based remote vehicle service including a mapping service and a log collection service. Mapping service may be used via mapping subsystem 160, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log collection service may be used, for example, to collect and analyze observations made via sensors 130, 180 of one or more autonomous vehicles during operation, enabling updates to be made to the global repository, as well as for other purposes.

The processor(s) 122, 172 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

It will be appreciated that the collection of components illustrated in FIG. 1 for primary vehicle control system 120 and secondary vehicle control system 170 are merely for the sake of example. Individual sensors may be omitted in some implementations, multiple sensors of the types illustrated in FIG. 1 may be used for redundancy or to cover different regions around a vehicle, and other types of sensors may be used. Likewise, different types or combinations of control subsystems may be used in other implementations. Further, while subsystems 152-160, 192-194 are illustrated as being separate from processors 122, 172 and memory 124, 174, respectively, it will be appreciated that in some implementations, portions or all of the functionality of subsystems 152-160, 192-194 may be implemented with corresponding program code instruction(s) 126, 176 resident in one or more memories 124, 174 and executed by processor(s) 122, 174 and that these subsystems 152-160, 192-194 may in various instances be implemented using the same processors and memory. Subsystems 152-160, 192-194 in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and other components. Further, the various components in primary vehicle control system 120 and secondary vehicle control system 170 may be networked in various manners.

Those skilled in the art will recognize that the exemplary environment illustrated in FIG. 1 is not intended to limit the present invention. Indeed, those skilled in the art will recognize that other alternative hardware and software environments may be used without departing from the scope of the invention.

Figure 2A:
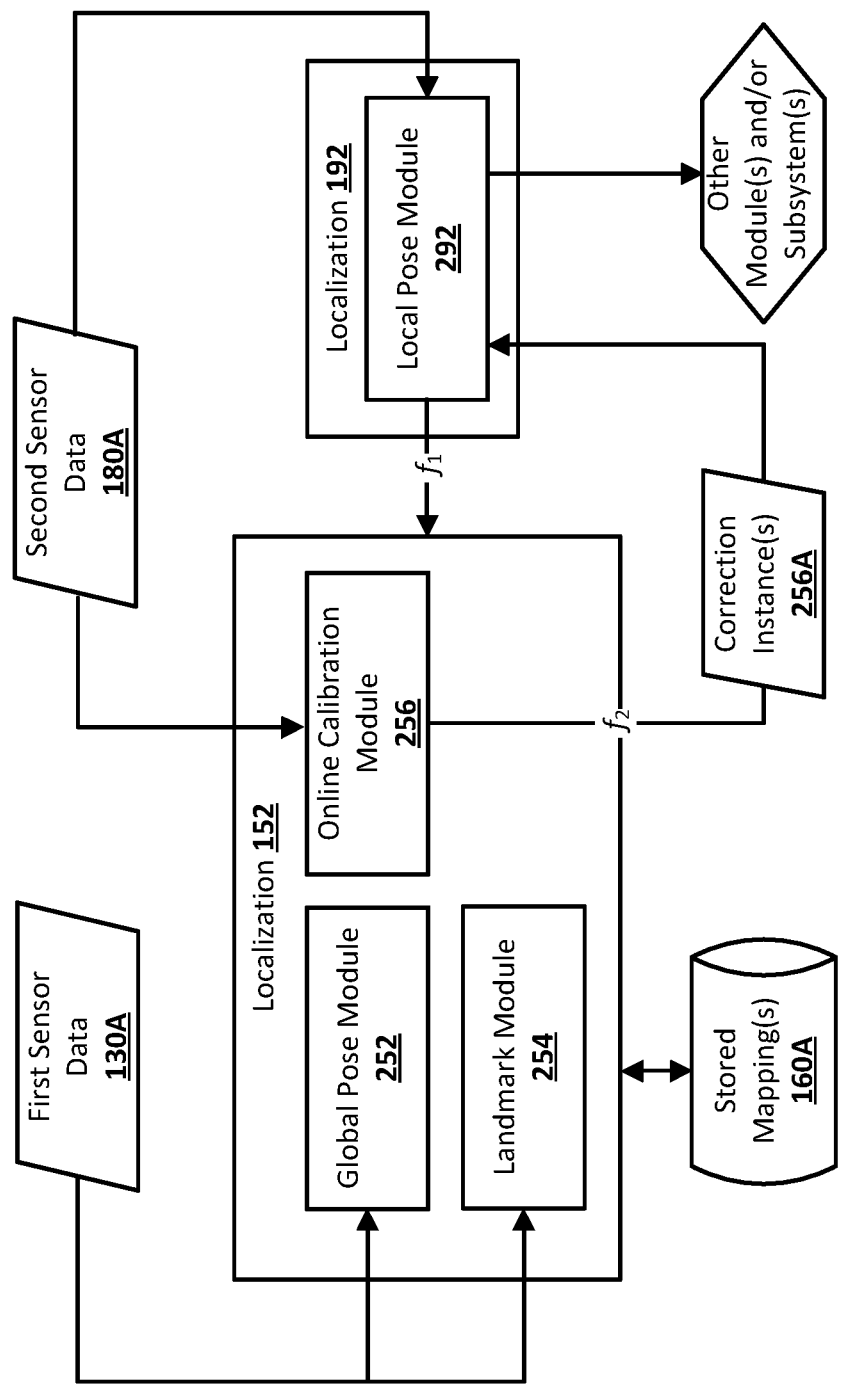
FIG. 2A is a block diagram illustrating an example implementation of using the localization subsystems referenced in FIG. 1 online, in accordance with various implementations.

Turning now to FIG. 2A, a block diagram illustrating an example implementation of using the localization subsystems referenced in FIG. 1 online is depicted. As shown in FIG. 2A, localization subsystem 152 of primary vehicle control system 120 includes at least global pose module 252, landmark module 254, and online calibration module 256. Further, localization subsystem 192 of secondary vehicle control system 170 includes at least local pose module 292. Notably, the implementations discussed in connection with FIG. 2A are performed online. In other words, these implementations can be executed as program code by a vehicle (an autonomous vehicle (e.g., vehicle 100 of FIG. 1) or a non-autonomous vehicle retrofitted with sufficient sensors), by a remote system in communication with the vehicle, or by both, during an episode of locomotion of the vehicle. Data generated by the localization subsystems 152, 192 can be transmitted between the localization subsystems 152, 192 (or the modules included therein), can be transmitted to other subsystems described herein, or any combination thereof. The data can include, for example, global pose instance(s) of a global pose of vehicle 100, local pose instance(s) of a local pose of vehicle 100, correction instance(s), or any combination thereof. Further, data generated by sensors (e.g., primary sensor system 130, secondary sensor system 180, or both) of vehicle 100 can be received by the localization subsystems 152, 192.

Global pose module 252 can generate global pose instances of a global pose of vehicle 100. The global pose of vehicle 100 represents a pose of vehicle 100 with respect to a reference frame (e.g., tile(s)), and the global pose instances represent orientation information and location information of vehicle 100 at a given time instance with respect to the reference frames. Further, global pose module 252 can receive instances of first sensor data 130A, and the global pose instances can be generated based at least in part on the instances of first sensor data 130A. The first sensor data 130A can include, for example, instances of LIDAR data generated by the LIDAR sensor 136 of primary sensor system 130. For example, global pose module 252 can generate the global pose instances by assembling an instance of LIDAR data generated by the LIDAR sensor 136 into one or more point clouds, and aligning one or more of the point clouds with one or more previously stored point clouds of the surrounding environment of vehicle 100 (e.g., retrieved from stored mapping(s) database 160A using mapping subsystem 160) using one or more geometric matching techniques, such as iterative closest point ("ICP").

In various implementations, global pose module 252 further generates the global pose instances based on local pose instances generated by local pose module 292 of localization subsystem 192. For example, the local pose instances can provide information to global pose module 252 for identifying the one or more previously stored point clouds of the surrounding environment of vehicle 100. This information can include, for example, a tile in which vehicle 100 is located or a neighborhood of tiles surrounding the tile in which vehicle 100 is located. In some additional or alternative implementations, global pose module 252 further generates the global pose instances based on instances of second sensor data generated by second sensor(s) of vehicle 100 (e.g., IMU(s) 140, 182, wheel encoder(s) 142, 184, other sensors, or any combination thereof). Further, global pose module 252 can transmit generated global pose instances to landmark module 254, online calibration module 256, or both.

Landmark module 254 can generate a first predicted location of a landmark relative to vehicle 100, and a second predicted location of the landmark relative to vehicle 100. The landmark can include any object or surface in a previously mapped environment that can be reliably detected by the LIDAR sensor 136, including, for example, a curb, a road retroreflector, a pavement marker, a lane line, an entry point of an intersection, a lane divider, a roadway sign, a traffic light, a sign post, a building, or any other object or surface that can be reliably detected be reliably detected by the LIDAR sensor 136. A given instance of the first sensor data 130A can include LIDAR data that includes one or more features that are indicative of the landmark. Landmark module 254 can identify the landmark based on the one or more features that are indicative of the landmark. In various implementations, the landmark can include a retroreflective surface, and the given instance of the first sensor data 130A can include LIDAR data that includes one or more saturated regions caused by the retroreflective surface of the landmark. Detecting landmarks in instances of LIDAR data is described in greater detail below (e.g., with respect to FIG. 4).

In some implementations, landmark module 254 can generate the first predicted location of the landmark directly based on an instance of LIDAR data included in the first sensor data 130A. More particularly, landmark module 254 can generate the first predicted location of the landmark by assembling the instance of the LIDAR data included in the instance of the first sensor data 130A into one or more point clouds, identifying, in one or more of the point clouds, one or more saturated regions caused by the retroreflective surface of the landmark, and determining the first predicted location of the landmark based on the one or more saturated regions in one or more of the assembled point clouds. The one or more saturated regions can be utilized as the first predicted location of the landmark. In these implementations, the first predicted location of the landmark can be considered a LIDAR-based predicted location of the landmark in the environment of vehicle 100. Landmark module 254 can transmit the first predicted location of the landmark to online calibration module 256.

In some additional or alternative versions of those implementations, landmark module 254 can generate the first predicted location of the landmark based on the global pose instances generated by global pose module 252. As noted above, global pose module 252 generates the global pose instances by assembling instances of LIDAR data included in the first sensor data 130A into one or more point clouds, and aligning the one or more point clouds with one or more previously stored point clouds. In some versions of those implementations, landmark module 254 can analyze the one or more point clouds assembled in generating the global pose instances to identify one or more saturated regions caused by the retroreflective surface of the landmark. The one or more saturated regions can be utilized as the first predicted location of the landmark. Again, in these implementations, the first predicted location of the landmark can be considered a LIDAR-based predicted location of the landmark in the environment of vehicle 100. Landmark module 254 can transmit the first predicted location of the landmark to online calibration module 256.

In some implementations, landmark module 254 can generate the second predicted location of the landmark directly based on a determined local pose instance of a local pose of vehicle 100, and based on a stored location of the landmark (e.g., retrieved from stored mapping(s) database 160A using mapping subsystem 160). The determined local pose instance can be generated based on an instance of the second sensor data 180A that temporally corresponds to the instance of the LIDAR data utilized to generate the first predicted location of the landmark. The instances of the sensor data 180A can include sensor data generated by IMU(s) 140, 182, wheel encoder(s) 142, 184 of vehicle 100, or both. Generating the local pose instances in described in greater detail below (e.g., with respect to local pose module 292). Notably, the instances of the second sensor data 180A do not include the LIDAR data utilized in generating the first predicted location of the landmark.

In some implementations, landmark module 254 can generate the second predicted location of the landmark by accessing the mapping of the environment of vehicle 100, identifying a previously stored point cloud from the mapping that includes a stored saturated region caused by the retroreflective surface of the landmark when the environment was previously mapped, and determining the second predicted location of the landmark based on the determined local pose instance and based on the stored saturated region in the previously stored point cloud. The identified location of the stored saturated region can be utilized as the second predicted location of the landmark. In some additional or alternative implementations, landmark module 254 can generate the second predicted location of the landmark by accessing the mapping of the environment of vehicle 100, identifying the stored location of the landmark, and determining the second predicted location of the landmark based on the determined local pose instance and the stored mapping. Notably, in these implementations, landmark module 254 can generate the second predicted location of the landmark without utilization of any vision sensor data (i.e., without RADAR sensor 134, LIDAR sensor 136, camera(s) 138, other vision sensor data, or any combination thereof). Put another way, the second predicted location of the landmark can be considered a pose-based predicted location of the landmark in the environment of vehicle 100. Moreover, since the first predicted location and the second predicted location of the landmark are generated using temporally corresponding sensor data (e.g., sensor data generated at the same time or within a threshold amount of time, such as 50 milliseconds, 100 milliseconds, or any other threshold amount of time), the first predicted location and the second predicted location of the landmark should be the same location, assuming the determined local pose of vehicle 100 is accurate. Landmark module 254 can transmit the second predicted location of the landmark to online calibration module 256.

In various implementations, the predicted locations of the landmark can be defined in n-dimensional space, relative to vehicle 100, or any other space or representation that allows locations or values to be compared. Further, the predicted locations of the landmark can include orientation information of the predicted landmark. For example, the predicted locations can be defined in n-dimensional space within a given tile, where the n-dimensional space is 2-dimensional space, 2.5-dimensional, 3-dimensional space, 4-dimensional space, and can optionally include an orientation component. In this example, the first predicted location can be located at X1, Y1, and Z1 within a given tile of vehicle 100, and the second predicted location can be located at X2, Y2, and Z2 within the given tile of vehicle 100. As another example, the predicted locations can be defined with respect to relative to vehicle 100. In this example, the first predicted location can be located at X1, Y1, and Z1 from a given point of vehicle 100, and the second predicted location can be located at X2, Y2, and Z2 from the given point of vehicle 100.

Online calibration module 256 can generate a correction instance(s) 256A based on comparing the first predicted location (e.g., LIDAR-based predicted location) of the landmark and the second predicted location (e.g., pose-based predicted location) of the landmark. More particularly, online calibration module 256 can compare the predicted locations to determine an error in the determined local pose instance of vehicle 100 based on a difference between the first predicted location and the second predicted location from the comparing. For example, assume the first predicted location of the landmark is located at X1, Y1, and Z1 in n-dimensional space having a first orientation, and further assume the second predicted location of the landmark is located at X2, Y2, and Z2 in n-dimensional space having a second orientation. In this example, online calibration module 256 can compare X1 and X2, Y1 and Y2, Z1 and Z2, and the first orientation and the second orientation, and the difference can be a positional and orientation difference determined based on these comparisons in the n-dimensional space. Moreover, the correction instance(s) 256A generated by online calibration module 256 can be an offset generated based on the difference (i.e., error) between the predicted locations generated by landmark module 254. Online calibration module 256 can transmit the correction instance(s) 256A to local pose module 292.

In some additional or alternative implementations, online calibration module 256 can generate the correction instance(s) 256A based at least in part on the global pose instance transmitted to online calibration module 256 from global pose module 252. In some versions of those implementations, the correction instance 256A can include drift rate(s) across multiple local pose instances. The drift rate(s) can indicate a first magnitude of drift, in one or more dimensions (e.g., X-dimension, Y-dimension, Z-dimension, roll-dimension, pitch-dimension, yaw-dimension, other dimensions, or any combination thereof), over a period of time, or a second magnitude of drift, in one or more of the dimensions, over a distance. Put another way, the drift rate(s) can include, for example, a temporal drift rate, a distance drift rate, or both. The temporal drift can represent a magnitude of drift, in one or more dimensions, in generating the multiple local pose instances over the period of time in generating the multiple local pose instances. Further, the distance drift rate can represent a magnitude of drift, in one or more dimensions, over a distance travelled in generating the multiple local pose instances. In some versions of those implementations, the correction instance(s) 256A can include a linear combination of the temporal drift rate and the distance drift rate. In some further versions of those implementations, the correction instance(s) 256A can be generated as a function of the difference in the predicted locations generated by landmark module 254 and the drift rate(s) determined by online calibration module 256 based at least in part on the global pose instances.

In some versions of those implementations, the correction instance be further generated based on instances of the second sensor data 180A. As shown in FIG. 2A, online calibration module 256 can receive instances of the second sensor data 180A. The second sensor data 180A can include, for example, IMU data generated by one or more of IMU(s) 140, 182, wheel encoder data generated by wheel encoder(s) 142, 184, or both. The instances of the second sensor data 180A can include instances of the IMU data, the wheel encoder data, or both. For example, the instances of the IMU data and the wheel encoder data, of an instance of the second sensor data 180A, can be the most recently generates instances of the IMU data and the wheel encoder data. Further, online calibration module 256 can transmit the generated correction instance(s) 256A to local pose module 292. In some additional or alternative implementations, the correction instance(s) 256A can include, or be limited to, one of: the offset generated based on the difference between the predicted locations generated by landmark module 254, or the drift rate(s) generated based on the global pose instances generated by global pose module 252 or the instances of the second sensor data 180A.

Local pose module 292 can generate local pose instances of a local pose of vehicle 100. Like the global pose, the local pose of vehicle 100 also represents a pose of vehicle 100 with respect to a frame of reference (e.g., tile(s)), which can be the same frame of reference as that of the global pose of vehicle 100. The local pose instances represent orientation information and location information with respect to a given tile at a given time instance. However, in contrast with the global pose, the local pose is not generated based on any vision data (e.g., LIDAR data or other vision data). Rather, as shown in FIG. 2A, local pose module 292 can receive instances of the second sensor data 180A described above (e.g., IMU data generated by IMU(s) 140, 182, wheel encoder data generated by wheel encoder(s) 142, 184, or both), and the local pose instances can be generated based at least in part on instances of the second sensor data 180A. Generating local pose instances without utilization of any vision data can enable the local pose instances to be generated more frequently (e.g., at a frequency that is greater than that of vision data generation) and using less computational resources. Further, generating local pose instances without utilization of any vision data can enable the local pose instances to be generated even when the vision sensor(s) generating the vision data are malfunctioning.

In some implementations, the local pose instances can be further generated based on the correction instance(s) 256A transmitted to local pose module 292 from online calibration module 256. By generating the local pose instances based on the correction instance(s) 256A, which is generated based on the differences (i.e., error) in the predicted locations or the global pose instances as described above, errors in generating the local pose instances can be quickly and efficiently corrected. Thus, the local pose instances more accurately reflect an actual pose of vehicle 100, and the local pose instances can be utilized by various other subsystem(s) described herein to control operation of vehicle 100 (e.g., planning subsystem 154, control subsystem 158, controlled stop subsystem 194, or other subsystems). As described herein, in various implementations the correction instance(s) 256A are generated based temporally corresponding sensor data. Local pose module 292 can generate local pose instances, utilizing the correction instance(s) 256A, more efficiently than if global pose instances were instead utilized in generating the local pose instances. Yet further, the correction instance(s) 256A can be applicable to and utilized in generating multiple local pose instances, whereas global pose instances are only applicable to generating a single temporally corresponding local pose instance as described above. Moreover, local pose module 292 can transmit the generated local pose instances to other module(s), subsystem(s) described herein (e.g., with respect to FIGS. 1-3), or both.

Notably, and as depicted in FIG. 2A, the local pose instances can be generated by local pose module 292 at a first frequency $f_1$ and the correction instance(s) 256A can be generated by online calibration module 256 at a second frequency $f_2$, where the first frequency $f_1$ is higher than the second frequency $f_2$. Put another way, the local pose instances are generated at a faster rate than the correction instance(s) 256A. In this manner, a plurality of local pose instances can be generated based on the same correction instance(s) 256A, and prior to receiving, at the local pose module 292, additional correction instance(s) 256A that is generated based on further vision data. When the additional correction instance(s) 256A is received at local pose module 292, a plurality of additional local pose instances can then be generated based on the additional correction instance(s) 256A. Thus, local pose module 292 can track relative movement of vehicle 100, and errors in tracking the relative movement of vehicle 100 can be mitigated by periodically adjusting calculations at local pose module 292 via the correction instance(s) 256A that is generated on differences (i.e., error) in predicted locations of a given landmark as described above with respect to landmark module 254, actual locations of vehicle 100 as indicated by the global pose instances as described above with respect to global pose module 252, or both.

In various implementations, the correction instance(s) 256A can be generated most of the time (or even exclusively) based on the global pose instances, and the difference (i.e., error) in the predicted locations of the landmark can be determined periodically. In this manner, the difference in the predicted locations of the landmark can be utilized to periodically check the accuracy of the generated pose instances. Further, the difference can be utilized to generate to generate an offset to be included in the correction instance(s) 256A. In some additional or alternative implementations, the correction instance(s) 256A can be generated most of the time based on the difference in the predicted locations for the sake of redundancy in verifying the generated pose instances of vehicle.

Figure 2B:
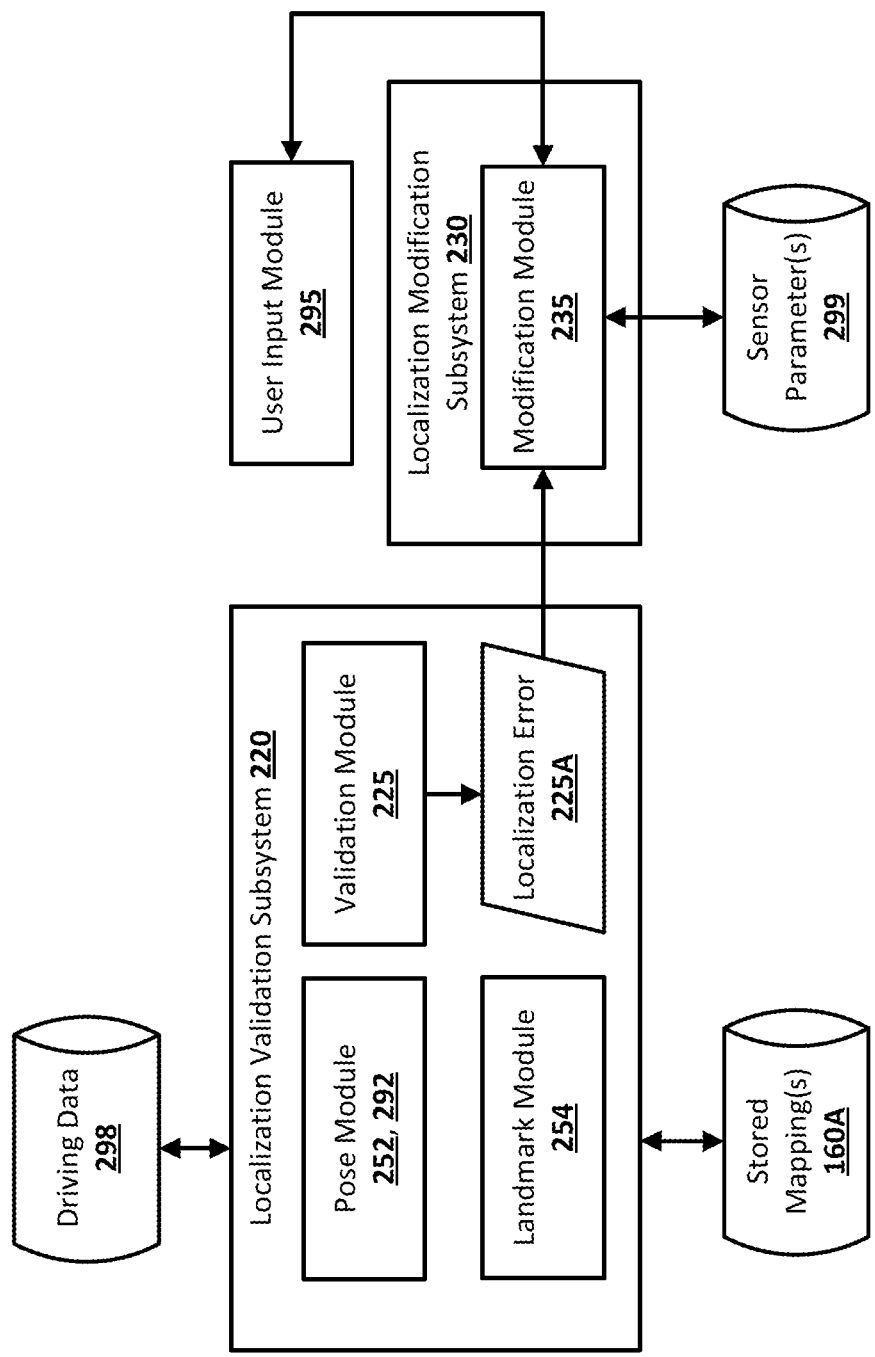
FIG. 2B is a block diagram illustrating an example implementation of validating the localization subsystems referenced in FIG. 1 offline, in accordance with various implementations.

Turning now to FIG. 2B, a block diagram illustrating an example implementation of validating the localization subsystems referenced in FIG. 1 offline is depicted. As shown in FIG. 2B, localization validation subsystem 220 includes at least pose module 252, 292, landmark module 254, and validation module 225. Further, localization modification subsystem 230 can include at least modification module 235. Notably, the implementations discussed in connection with FIG. 2B are performed offline, as opposed to online like the implementations discussed above in connection with FIG. 2A. In other words, these implementations can be executed as program code a remote subsequent to an episode of locomotion of the vehicle. For the sake of simplicity, an instance of the global pose module 252 and an instance of the local pose module 292 of FIG. 2A are depicted in FIG. 2B as a single module (e.g., as indicated by pose module 252, 292) that is capable of generating both global pose instance(s) of a global pose of the vehicle and local pose instance(s) of a local pose of the vehicle as described above with respect to FIG. 2A. Data generated by the localization validation subsystem 220 and the localization modification subsystem 230 can be transmitted between one another, other subsystems described herein, or any combination thereof.

In some implementations, pose module 252, 292 can process an instance of sensor data included in driving data generated during a past episode of locomotion of a vehicle. The driving data can be stored in driving data database 298, and can include at least instances of sensor data generated the past episode of locomotion of the vehicle. The instances of the sensor data can include, for example, various instances of the first sensor data 130A and the second sensor data 180A that are generated during the past episode of locomotion of the vehicle. In some versions of those implementations, the pose module 252, 292 can generate global pose instances of a global pose of the vehicle based on a given instance of the first sensor data 130A from the past episode (e.g., as described above with respect to global pose module 252 in FIG. 2A). In some additional or alternative versions of those implementations, the pose module 252, 292 can generate local pose instances of a local pose of the vehicle based on a given instance of the second sensor data 190A from the past episode (e.g., as described above with respect to local pose module 292 in FIG. 2A).

In some implementations, landmark module 254 can generate a predicted location of a landmark in an environment of the vehicle captured in the sensor data that was generated during the past episode of locomotion. Further, landmark module 254 can identify a stored location of the landmark in the environment of the vehicle from the past episode of locomotion. In some versions of those implementations, landmark module 254 can generate the predicted location of the landmark directly based on an instance of LIDAR data included in a given instance of the first sensor data 130A from the driving data corresponding to the past episode of locomotion (e.g., as described above with respect to landmark module 254 in FIG. 2A). In other versions of those implementations, landmark module 254 can generate the predicted location of the landmark based on the global pose instances generated by global pose module 252 (e.g., as described above with respect to landmark module 254 in FIG. 2A). In some additional or alternative versions of those implementations, landmark module 254 can generate the predicted location of the landmark based on local pose instance of a local pose of vehicle 100, and based on a stored location of the landmark retrieved from stored mapping(s) database 160A (e.g., as described above with respect to landmark module 254 in FIG. 2A). In these implementations, the predicted location of the landmark can be considered a pose-based predicted of the landmark.

In various implementations, validation module 225 can compare the pose-based predicted location of the landmark to the stored location of the landmark to determine a localization error 225A in generating the pose-based predicted location of the landmark (e.g., similar to the online calibration module 256 of FIG. 2A). For example, assume the pose-based predicted location of the landmark is located at X1, Y1, and Z1 in n-dimensional space having a first orientation, and further assume the stored location of the landmark is located at X2, Y2, and Z2 in n-dimensional space having a second orientation. In this example, validation module 255 can compare X1 and X2, Y1 and Y2, Z1 and Z2, and the first orientation and the second orientation, and the difference can be a positional and orientation difference determined based on these comparisons in the n-dimensional space. In some versions of those implementations, validation module 225 can compare the localization error 225A to an error threshold. If the localization error 225A fails to satisfy the error threshold, then validation module 225 may classify the pose-based predicted location of the landmark as accurate, discard the localization error 225A, and analyze additional instances of the sensor data generated during the past episode of locomotion to continue validating localization of the vehicle. Moreover, in various implementations, classifying the pose-based predicted location as accurate may indicate that the driving data can be utilized in training additional ML model(s) (e.g., one or more of a planning ML model, a perception ML model, or other ML model(s) utilized by an autonomous vehicle). However, if the localization error 225A satisfies the error threshold, then validation module 225 may classify the pose-based predicted location of the landmark as not accurate, and transmit the localization error 225A to modification module 235 of localization modification subsystem 230. Moreover, in various implementations, classifying the pose-based predicted location as not accurate may indicate that the driving data should not be utilized in training additional ML model(s) (e.g., one or more of a planning ML model, a perception ML model, or other ML model(s) utilized by an autonomous vehicle).

In some implementations, modification module 235 can process the localization error 225A to automatically adjust corresponding parameters of one or more sensors that generated instances of sensor data utilized in generating the pose-based predicted location of landmark that was classified as not accurate based on the localization error 225A. The modification module 235 can access corresponding sensor parameter(s) (e.g., stored in sensor parameter(s) database) of one or more of the sensors that generated instances of sensor data utilized in generating the pose-based predicted location of landmark. The parameter(s) of the LIDAR sensor(s) can include, for example, a point density of LIDAR points, a scan pattern of the LIDAR sensor(s), a field-of-view of the LIDAR sensor(s), a duration of a sensing cycle of the LIDAR sensor(s), one or more biases of the LIDAR sensor(s), other LIDAR parameters, or any combination thereof. The parameter(s) of the wheel encoder(s) can include, for example, an encoding type, a number of pulses per inch (or other distance), a number of pulses per shaft revolution, one or more biases of the wheel encoder(s), other wheel encoder parameters, or any combination thereof. The parameter(s) of the IMU(s) can include, for example, gyroscopic parameters of the IMU(s), accelerometer parameters of the IMU(s), a sampling frequency of the IMU(s), one or more biases of the IMU(s), other IMU parameters, or any combination thereof. Further, the adjusted parameter(s) of the sensor(s) of the vehicle can be utilized in subsequent episodes of locomotion.

In implementations where the pose-based predicted location of the landmark is generated based on an instance of LIDAR data, modification module 235 may only adjust one or more of the corresponding parameters(s) of the LIDAR sensor(s). For example, if the localization error 225A satisfies a first error threshold, then a point density of the LIDAR sensor may be increased by a first amount. Further, if the localization error 225A satisfies a second error threshold, then the point density of the LIDAR sensor may be increased by a second amount that is different from the first amount. As another example, if the localization error 225A satisfies the error threshold for a threshold quantity of instances for the past episode of locomotion (e.g., for analyzing 7 of 10 distinct instances), then the scan pattern of the LIDAR sensor may be adjusted from a parallel scan pattern to a sinusoidal scan pattern. In implementations where the pose-based predicted location of the landmark is generated based on an instance of wheel encoder data and IMU data, modification module 235 may only adjust one or more of the corresponding parameters(s) of the wheel encoders(s), the IMU(s), or both. For example, if the localization error 225A satisfies a first error threshold, then one or more biases of the wheel encoder(s), the IMU(s), or both may be adjusted.

In some additional or alternative implementations, user input module 295 may receive user input that additionally or alternatively adjusts the corresponding parameters of one or more of the sensors that generated instances of sensor data utilized in generating the pose-based predicted location of landmark that was classified as not accurate based on the localization error 225A. The user input may be received responsive to the determination that localization error 225A satisfied the error threshold. For example, a human operator may receive a notification generated by the validation module 225 that indicates the localization error 225A for the pose-based predicted location of the landmark satisfies the error threshold. In this example, the human operator may provide user input that is detected via the user input module 295 to adjust the parameter(s) of the sensor(s). In subsequent episodes of locomotion, the vehicle (and optionally other vehicles), can utilize the adjusted corresponding parameter(s) of the sensor(s). By adjusting the corresponding parameter(s) of the sensor(s) offline in this manner, subsequent pose instance(s) generated based on instances of sensor data generated by the sensor(s) that utilize the adjusted corresponding parameter(s) may be more accurate.

Figure 3:
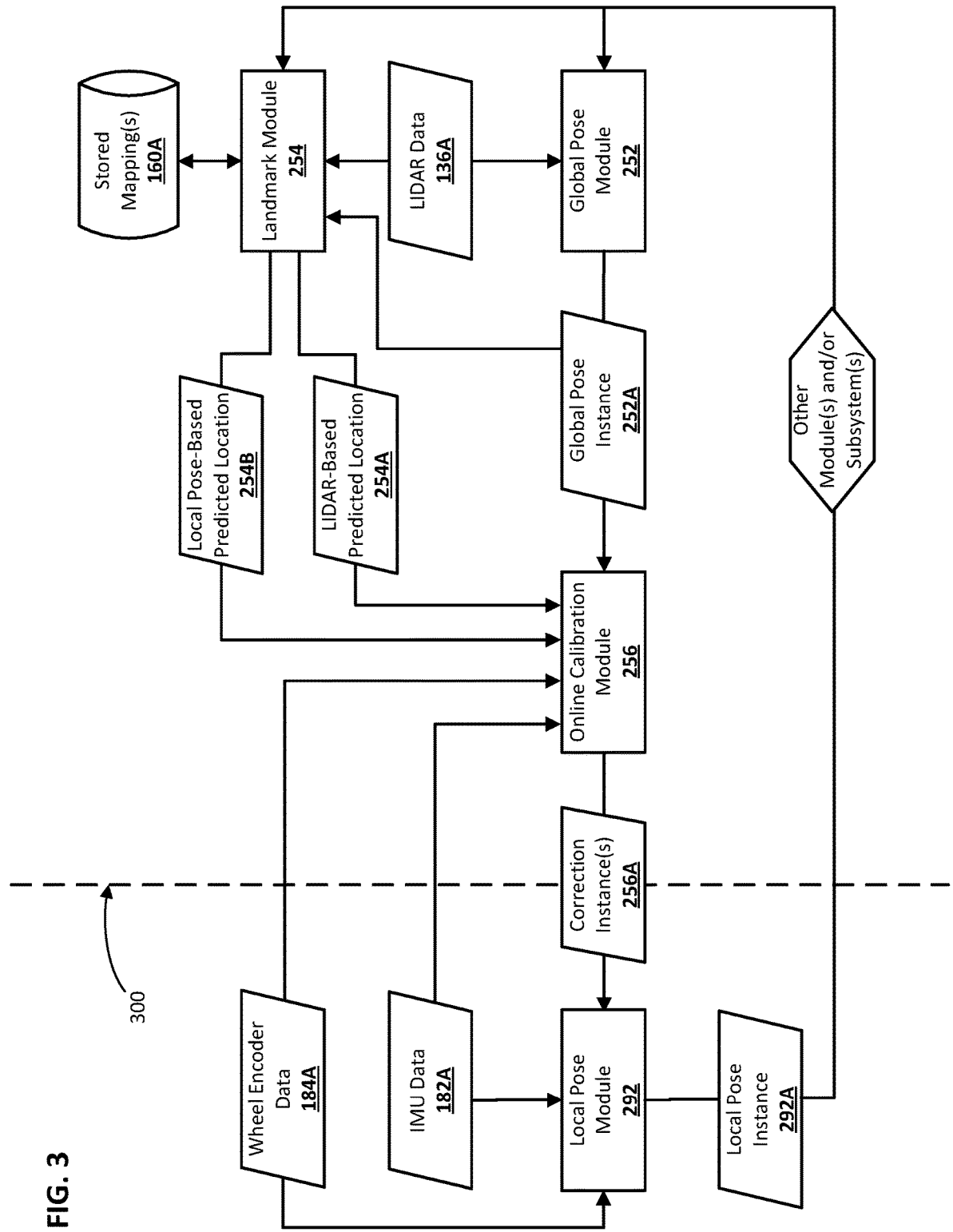
FIG. 3 is a process flow illustrating an example implementation of the localization subsystems referenced in FIG. 2A, in accordance with various implementations.

Turning now to FIG. 3, a process flow illustrating an example implementation of the localization subsystems referenced in FIG. 2A is depicted. The process flow of FIG. 3 can be implemented by primary vehicle control system 120 and secondary vehicle control system 170. In particular, modules on left side of dashed line 300 can be implemented by secondary vehicle control system 170 (e.g., via localization subsystem 192), and modules on the right side of the dashed line 300 can be performed by primary vehicle control system 120 (e.g., via localization subsystem 152). Although FIG. 3 is described herein as being implemented by both the primary vehicle control system 120 and the secondary vehicle control system 170, it should be understood that the modules can be implemented entirely, or in part, by the primary vehicle control system 120, the secondary vehicle control system 170, a remote computing system in communication with vehicle 100 over one or more networks, or any combination thereof.

Local pose module 292 can receive instances of IMU data 182A generated by one or more IMUs of vehicle 100 (e.g., IMU(s) 182 of secondary sensor system 180, IMU(s) 140 of primary sensory system 130, or any combination thereof). Further, local pose module 292 can also receive instances of wheel encoder data 184A generated by one or more wheel encoders of vehicle 100 (e.g., wheel encoder(s) 184 of secondary sensor system 180, wheel encoders(s) 142 of primary sensory system 130, or both). The combination of the IMU data 182A, the wheel encoder data 184A, and any other non-vision data is sometimes referred to herein as "second sensor data" (e.g., second sensor data 180A of FIG. 2A). Notably, the IMU data 182A and the wheel encoder data 184A can be generated at different frequencies. Local pose module 292 can include in propagated filter(s) that incorporates the most recent version of sensor data in instances of the second sensor data (i.e., anytime machinery). Further, local pose module 292 can receive a correction instance(s) 256A generated by online calibration module 256 as described above with respect to FIG. 2A.

Moreover, local pose module 292 can process, using a state estimation model that is filter-based (e.g., Kalman filter, extended Kalman filter, dual Kalman filter, or other filter-based techniques) or observer-based (e.g., recursive least squares or other observer-based techniques), the instance of the second sensor data (including IMU data 182A and wheel encoder data 184A) and optionally the correction instance(s) 256A to generate output. The output can include, for example, a local pose instance 292A of a local pose of vehicle 100, estimated velocities of vehicle 100, estimated accelerations of vehicle 100, or any combination thereof. Local pose module 292 can then transmit the local pose instance 292A to other module(s) (e.g., global pose module 252, landmark module 254, online calibration module 256, or any combination thereof) or subsystem(s) (e.g., planning subsystem 154, control subsystem 158, controlled stop subsystem 194, or any combination thereof) over one or more networks via network interfaces 198. It should also be noted that a frequency at which local pose instances are generated can be based on the frequency at which instances of the second sensor data are generated.

In some implementations, landmark module 254 can process an instance of LIDAR data 136A generated by the LIDAR sensor 136 of vehicle 100 to generate a LIDAR-based predicted location 254A of a landmark in a surrounding environment of vehicle 100. The instance of the LIDAR data 136A processed by landmark module 254 can include one or more features that are indicative of the landmark. Put another way, the LIDAR-based predicted location 254A of the landmark can generated directly based on the instance of the LIDAR data 136A. For example, the landmark may include a retroreflective surface, and the one or more features included in the instance of the LIDAR data 136A that are indicative of the landmark may be one or more saturated regions caused by the retroreflective surface of the landmark. Landmark module 254 can identify a location that corresponds to the one or more saturated regions in one or more assembled point clouds from the LIDAR data 136A, and can utilize the identified location as the LIDAR-based predicted location 254A of the landmark. Identifying the location that corresponds to the one or more saturated regions in described in greater detail below (e.g., with respect to FIG. 4). The LIDAR-based predicted location 254A can be transmitted to online calibration module 256.

In some additional or alternative implementations, landmark module 254 can process a global pose instance to generate the LIDAR-based predicted location 254A of the landmark in the surrounding environment of vehicle 100. As described above with respect to FIG. 2A, global pose module 252 can also assemble one or more point clouds from the LIDAR data 136A, and landmark module 254 can generate the LIDAR-based predicted location 254A from the global pose instance 252A generated based on the instance of the LIDAR data 136A in a similar manner as described above with respect to generating the LIDAR-based predicted location 254A directly based on the instance of the LIDAR data 136A. The LIDAR-based predicted location 254A can be transmitted to online calibration module 256.

Moreover, landmark module 254 can process the local pose instance 292A generated by local pose module 292 and a stored mapping of an environment of vehicle 100 (e.g., in stored mapping(s) database 160A) to generate a pose-based predicted location 254B of the landmark in the surrounding environment of vehicle 100. The local pose instance 292A can provide landmark module 254 with information that indicates a tile that vehicle 100 is located. Landmark module 254 can identify the stored mapping of the environment of vehicle 100 based on the information that indicates the tile that vehicle 100 is located. Moreover, landmark module 254 can utilize the local pose instance 292A to determine the orientation information and location information of vehicle 100 within a given tile (e.g., the environment of vehicle 100), and can identify a stored location of the landmark from the stored mapping based on the local pose instance 292A. Further, landmark module 254 can identify a location of the landmark based on the stored location of the landmark with respect to the local pose instance 292A of vehicle 100, and the identified location can be utilized as the pose-based predicted location 254B of the landmark. The stored location of the landmark can be a saturated region from one or more previously stored clouds of the tile in which vehicle 100 is located as indicated by the local pose instance 292A. The pose-based predicted location 254B can be transmitted to online calibration module 256.

Global pose module 252 can process the instance of the LIDAR data 136A generated by the LIDAR sensor 136 of vehicle 100, the local pose instance 292A generated by local pose module 292 to generate a global pose instance 252A, or both. The LIDAR data 136A generated by the LIDAR sensor 136 can generated at a slower rate than the IMU data 182A and the wheel encoder data 184A. The global pose instance 252A can identify a matching tile in which vehicle 100 is located, and orientation information and location information of vehicle 100 within the matching tile. In some implementations, global pose module 252 generates the global pose instance 252A by aligning a point cloud generated based on the LIDAR data 136A with one or more previously stored point clouds of a given tile (e.g., stored in stored mapping(s) database 160A). In some versions of those implementations, global pose module 252 can align the point cloud and one or more of the previously stored point clouds using various geometric matching techniques (e.g., iterative closest point ("ICP") or other geometry matching algorithms). The one or more previously stored point clouds can be stored in association with a given tile, and can be accessed over one or more networks (e.g., using mapping subsystem 160). In some further versions of those implementations, the one or more previously stored point clouds can be identified based on a most recently generated local pose instance (e.g., local pose instance 292A) based on the second sensor data (e.g., IMU data 182A and wheel encoder data 184A), or based on both. The one or more previously stored point clouds can be stored in association with the given tile associated with the most recently generated local pose instance (e.g., local pose instance 292A), a location of vehicle determined based on the second sensor data (e.g., IMU data 182A and wheel encoder data 184A), or both. The global pose instance 252A can be transmitted to online calibration module 256.

In some implementations, online calibration module 256 can process the LIDAR-based predicted location 254A and the pose-based predicted location 254B to generate the correction instance(s) 256A. Online calibration module 256 can compare the LIDAR-based predicted location 254A and the pose-based predicted location 254B to generate the correction instance. For example, assume the LIDAR-based predicted location 254A is located at X1, Y1, and Z1 within a given tile, and further assume the pose-based predicted location 254B is located at X1, Y1, and Z1 within the given example. In this example, the correction instance(s) 256A can be generated based on comparing these coordinates. Comparing the LIDAR-based predicted location 254A and the pose-based predicted location 254B to generate the correction instance(s) 256A is described in greater detail herein (e.g., with respect to FIG. 2A).

In some additional or alternative implementations, online calibration module 256 can additionally or alternatively process historical predicted locations of the landmark, including the LIDAR-based predicted location 254A and the pose-based predicted location 254B to generate the correction instance 256A. The historical predicted locations (both LIDAR-based and global-pose based) may be limited to those that are generated within a threshold duration of time with respect to a current time (e.g., within the last 100 seconds, 200 seconds, or other durations of time) and may be limited to temporally corresponding predicted locations of the same landmark, such that online calibration module 256 only considers a sliding window of the historical predicted locations for a given landmark. For example, online calibration module 256 can generate the correction instance(s) further as a function of comparing a historical pose-based predicted location of the landmark and a historical LIDAR-based predicted location of the landmark. In this example, the historical pose-based predicted location of the landmark can be previously generated based on a previous local pose instance that defined a previous location of vehicle 100 and the stored location of the landmark, and the historical LIDAR-based predicted location of the landmark can be previously generated based on a previous instance of the LIDAR data that includes one or more of the features that are indicative of the landmark. This enables online calibration module 256 to generate drift rate(s) based on comparing the temporally corresponding historical predicted locations of the landmark. Online calibration module 256 can transmit the correction instance(s) 256A to local pose module 292 over one or more networks via network interfaces 198, and multiple additional local pose instances can be generated using the correction instance(s) 256A. Thus, local pose instances generated by local pose module 292 can be generated based on the correction instance 256A as well as additional instance of the IMU data 182A and additional instances of the wheel encoder data 184A.

In some additional or alternative implementations, online calibration module 256 can additionally or alternatively process an instance of the IMU data 182A, an instance of the wheel encoder data 184A, and the global pose instance 252A to generate the correction instance(s) 256A. In some implementations, online calibration module 256 can process, using a state estimation model that is filter-based (e.g., Kalman filter, extended Kalman filter, dual Kalman filter, or other filter-based techniques) or observer-based (e.g., recursive least squares or other observer-based techniques), the instance of the IMU data 182A, the instance of the wheel encoder data 184A, and the global pose instance 252A to generate output. In some versions of those implementations, the output can include, for example, estimates of wheel radii of vehicle 100, sensor biases of individual sensors of vehicle 100 (e.g., sensor(s) included in primary sensor system 130 or secondary sensor system 180), or both. The correction instance(s) 256A can then be generated based on the estimates of the wheel radii of vehicle 100, the sensor biases of individual sensors of vehicle 100, or both. In other versions of those implementations, the output generated across the state estimation model can be the correction instance(s) 256A, such that the state estimation model acts like a black box.

Figure 4:
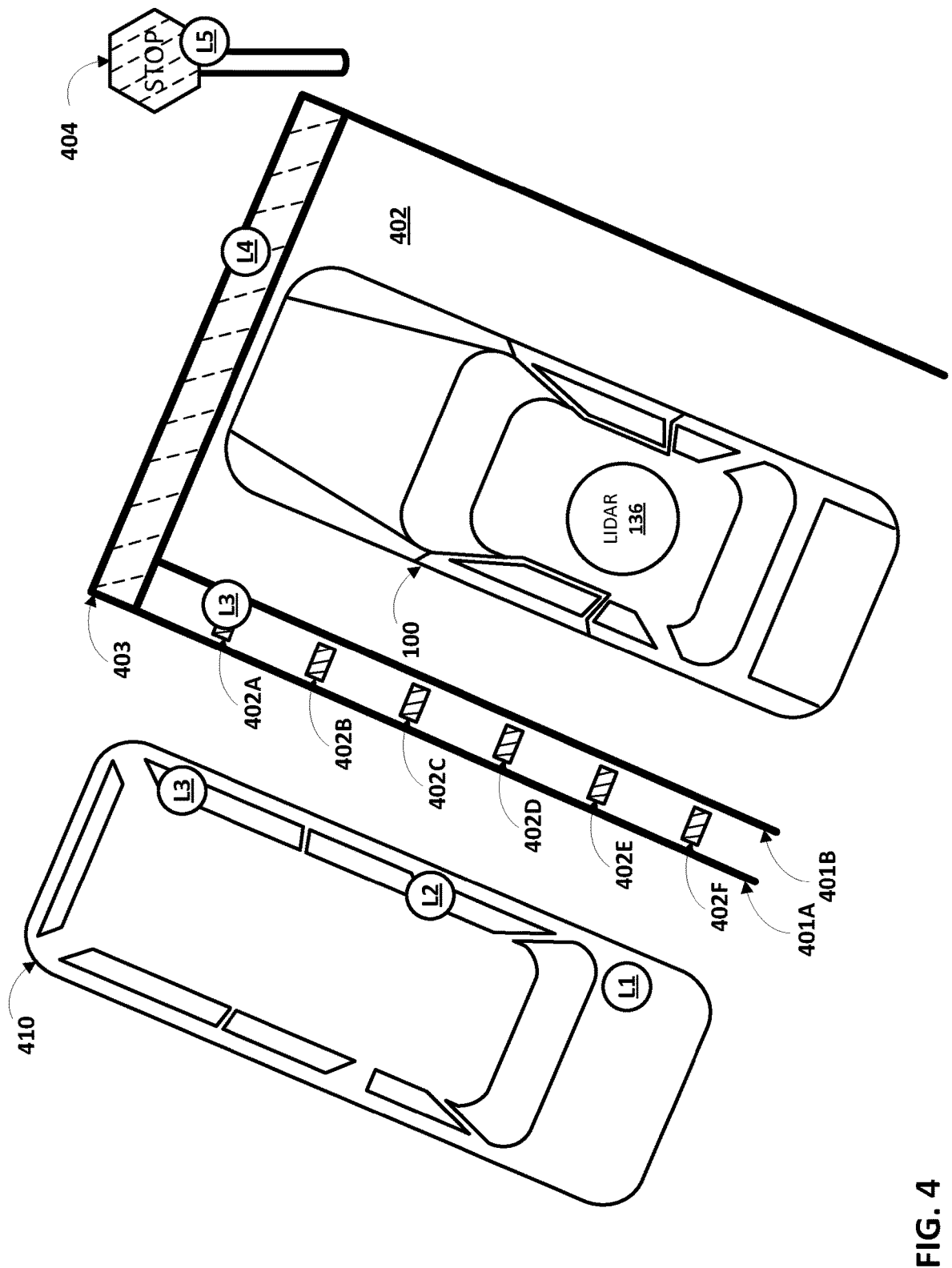
FIG. 4 is an example mapped environment that includes landmarks and that is being navigated by an autonomous vehicle, in accordance with various implementations.

Turning now to FIG. 4, an example mapped environment that includes landmarks and that is being navigated by vehicle 100 is depicted. Vehicle 100 includes the LIDAR sensor affixed to a top side of vehicle 100. Although vehicle 100 is depicted as including only a single LIDAR sensor affixed to the top side of vehicle 100, it should be understood that is for the sake of example and is not meant to be limiting. For example, the LIDAR sensor 136 can be affixed to other locations on vehicle 100, such as a hood of vehicle 100, a side of vehicle 100, a rear of vehicle, or any location on vehicle 100. Moreover, vehicle 100 can include multiple LIDAR sensors affixed to one or more of the aforementioned locations on vehicle 100. The LIDAR sensor 136 can, during a sensing cycle of the LIDAR sensor 136, generate an instance of LIDAR data. The instance of the LIDAR data generated during a given sensing cycle of the LIDAR sensor 136 can include a plurality of detected data points in the environment of vehicle 100. For example, the LIDAR sensor 136 can scan a certain area during a particular sensing cycle to detect an object or an environment in the area. For instance, an instance of the LIDAR data generated during a given sensing cycle of the LIDAR sensor 136 can include a first LIDAR data point L1, a second LIDAR data point L2, a third LIDAR data point L3, a fourth LIDAR data point L4, a fifth LIDAR data point L5, a sixth LIDAR data point L6, and optionally additional LIDAR data points. As described with respect to FIG. 2A, these LIDAR data points can be assembled into one or more point clouds.

In some implementations, LIDAR sensor 136 can include a phase coherent LIDAR component during a sensing cycle. In some versions of those implementations, the instances of the first sensor data 130A can include LIDAR data from a sensing cycle of LIDAR sensor 136. The LIDAR data from the sensing cycle of LIDAR sensor 136 can include, for example, a transmitted encoded waveform that is sequentially directed to, and sequentially reflects off of, each of a plurality of points in an environment of vehicle 100—and reflected portions of the encoded waveform are each detected, in a corresponding sensing event of the sensing cycle, by the at least one receiver of the phase coherent LIDAR component as data points. During a sensing cycle, the waveform is directed to a plurality of points in an area of the environment of vehicle 100, and corresponding reflections detected, without the waveform being redirected to those points in the sensing cycle. Accordingly, the range and velocity for a point that is indicated by the LIDAR data of a sensing cycle can be instantaneous in that is based on single sensing event without reference to a prior or subsequent sensing event. In some versions of those implementations, multiple (e.g., all) sensing cycles can have the same duration, the same field-of-view, or the same pattern of waveform distribution (through directing of the waveform during the sensing cycle). For example, multiple sensing cycles that include a sweep can have the same duration, the same field-of-view, and the same pattern of waveform distribution. However, in many other implementations the duration, field-of-view, or waveform distribution pattern can vary amongst one or more sensing cycles. For example, a first sensing cycle can be of a first duration, have a first field-of view, and a first waveform distribution pattern; and a second sensing cycle can be of a second duration that is shorter than the first, have a second field-of-view that is a subset of the first field-of-view, and have a second waveform distribution pattern that is denser than the first.

As described with respect to FIGS. 2A, 2B, and 3, landmarks, and locations thereof, can be stored in a mapping of the environment of vehicle 100, such as the environment depicted in FIG. 4. The landmarks can include any object or surface in a previously mapped environment that can be reliably detected by the LIDAR sensor 136, including, for example, a curb, a road retroreflector, a pavement marker, a lane line, an entry point of an intersection, a lane divider, a roadway sign, a traffic light, a sign post, a building, or any other object or surface that can be reliably detected be reliably detected by the LIDAR sensor 136. Further, the landmarks can be stored in association with one or more features, and the one or more features can include, for example, saturated region(s) caused by a retroreflective surface that are indicative of a corresponding landmark when the environment of vehicle 100 was previously mapped and stored (e.g., by vehicle 100, by another autonomous vehicle, or by other means). Accordingly, when vehicle 100 subsequently navigates through the environment corresponding to the stored mapping depicted in FIG. 4, landmarks can be identified from instances of LIDAR data generated by the LIDAR sensor 136 based on the one or more features that are indicative of the landmark.

The landmarks depicted in FIG. 4 include road retroreflectors 402A-402F affixed to a surface of a road 402 and positioned between a first lane line 401A and second land line 401B, an entry point of an intersection 403, and a stop sign 404. Notably, the landmarks 402A-402F, 403, and 404 depicted in FIG. 4 include retroreflective surfaces as indicated by the hatched markings on the landmarks 402A-402F, 403, and 404. Further, for the sensing cycle of the LIDAR sensor 136 depicted in FIG. 4, the fourth LIDAR data point L4 detects a first road retroreflector 402A of the road retroreflectors 402A-402F, the fifth LIDAR point L5 detects the entry point of the intersection 403, and the sixth LIDAR data point L6 detects the stop sign 404. Notably, the first LIDAR data point L1, the second LIDAR data point L2, and the third LIDAR data point L3 detect another vehicle 410 (autonomous or otherwise) travelling in an opposite direction of vehicle. However, the another vehicle 410 is not utilized as a landmark since the another vehicle 410 cannot be reliably detected by the LIDAR sensor 136 in the environment of vehicle 100 depicted in FIG. 4 (i.e., the another vehicle 410 is not always present in the environment of vehicle 100). Nonetheless, the first LIDAR data point L1, the second LIDAR data point L2, and the third LIDAR data point L3 can be utilized in assembling the one or more point clouds of the environment of vehicle 100 based on the LIDAR data generated by the LIDAR sensor 136.

Since the landmarks 402A-402F, 403, and 404 depicted in FIG. 4 include the retroreflective surfaces, saturated regions are detected at the fourth LIDAR data point L4, the fifth LIDAR point L5, and the sixth LIDAR data point L6, respectively. These saturated regions are indicative of a corresponding one of the landmarks 402A-402F, 403, and 404. More particularly, a first saturated region can be identified at the first road retroreflector 402A, a second saturated region can be identified at the entry point of the intersection 403, and a third saturated region can be identified at the stop sign 404. Further, locations of the environment corresponding to these saturated regions can be utilized as LIDAR-based predicted locations of the landmarks 402A-402F, 403, and 404.

The LIDAR-based predicted locations of one or more of the landmarks 402A-402F, 403, and 404 can be compared to pose-based predicted locations of a corresponding one of the landmarks 402A-402F, 403, and 404. The pose-based predicted locations of the landmarks 402A-402F, 403, and 404 can be generated based on a local pose instance of vehicle 100 that temporally corresponds to the instance of LIDAR data generated by the LIDAR sensor 136 depicted in FIG. 4, and based on a stored mapping of the landmarks 402A-402F, 403, and 404 as described in greater detail above (e.g., with respect to FIGS. 2A, 2B, and 3). For example, a first pose-based predicted location of the first road retroreflector 402A can be generated based on the local pose instance and the stored mapping of the first road retroreflector 402A. Further, the first pose-based predicted location of the first road retroreflector 402A can be compared to the LIDAR-based predicted location of the first road retroreflector 402A. This can optionally be repeated for the other landmarks 403 and 404 depicted in FIG. 4. By comparing the LIDAR-based predicted location and pose-based predicted location of the landmarks 402A-402F, 403, and 404, a difference therebetween can be determined, and an error in the predicted locations can be determined based on the difference.

In some implementations, the difference can be utilized to generate correction instances for generating additional local pose instances as described in greater detail above (e.g., with respect to FIGS. 2A, 2B, and 3). For example, an offset can be determined based on the difference, and the correction instances utilized in generating additional local pose instances can include the offset. In additional or alternative implementations, the difference can be compared to an error threshold in localization of vehicle 100. In some versions of those implementations, if the difference is greater than the error threshold, then vehicle 100 can perform a controlled stop using the local pose instances that are optionally generated using a correction instance generated based on the error. In some further versions of those implementations, if the difference is less than the error threshold, then vehicle 100 can continue normal operation of vehicle 100.

Although FIG. 4 is depicted as including multiple landmarks, it should be understood that is not meant to be limiting and that the techniques described herein can be utilized with a single landmark. Moreover, although FIG. 4 is described herein with respect to particular landmark that have retroreflective surfaces, it should be understood that is also not meant to be limiting and that the techniques described herein can be utilized with any object or surface that can be reliably detected using the LIDAR sensor 136.

Figure 5:
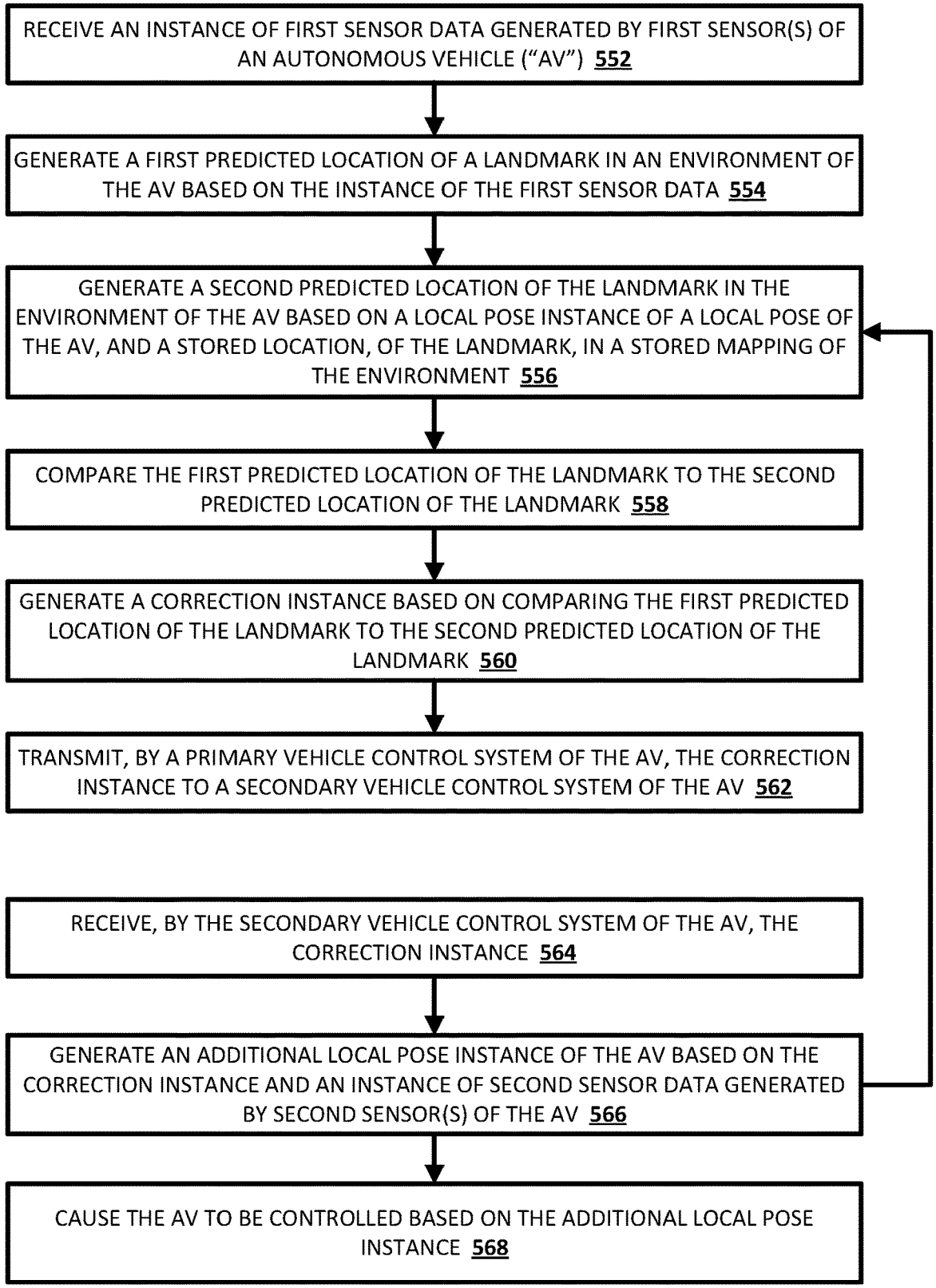
FIG. 5 is flowchart illustrating an example method for online localization of an autonomous vehicle, in accordance with various implementations.

Turning now to FIG. 5, an example method 500 for online localization of an autonomous vehicle is illustrated. The method 500 may be performed by an autonomous vehicle analyzing sensor data generated by sensor(s) of the autonomous vehicle (e.g., vehicle 100 of FIG. 1 or vehicle 400 of FIG. 4), by another vehicle (autonomous or otherwise), by another computer system that is separate from the autonomous vehicle, or various combinations thereof. For the sake of simplicity, operations of the method 500 are described herein as being performed by a system (e.g., processor(s) 122 or primary vehicle control system 120, processor(s) 172 of secondary vehicle control system 170, or any combination thereof). It will be appreciated that the operations of the method 500 may be varied, and that various operations may be performed in parallel or iteratively in some implementations, so the method 500 illustrated in FIG. 5 is merely provided for illustrative purposes.

At block 552, the system receives an instance of first sensor data generated by first sensors of an autonomous vehicle ("AV"). The first sensors can include, for example, at least a LIDAR sensor of the AV, and the first sensor data can include LIDAR data generated the LIDAR sensor of the AV. At block 554, the system generates a first predicted location of a landmark in an environment of the AV based on the instance of the first sensor data. Put another way, the first predicted location of the landmark can be a LIDAR-based predicted location of the landmark. At block 556, the system determines a second predicted location of the landmark in the environment of the AV based on a pose instance of a pose of the AV, and a stored location, of the landmark, in a stored mapping of the environment. Put another way, the second predicted location of the landmark can be a pose-based predicted location of the landmark that is based on a local pose instance of a local pose of the AV or a global pose instance of a global pose of the AV. Generating the first predicted location of the landmark (e.g., LIDAR-based predicted location) and the second predicted location of the landmark (e.g., pose-base predicted location) is described in greater detail herein (e.g., with respect to FIGS. 2A, 3, and 4).

At block 558, the system compares the first predicted location of the landmark to the second predicted location of the landmark. The system can determine a difference between the first predicted location of the landmark to the second predicted location of the landmark based on the comparing. At block 560, the system generates a correction instance based on comparing the first predicted location of the landmark to the second predicted location of the landmark. The generated correction instance can be, for example, an offset based on the difference between the first predicted location of the landmark to the second predicted location of the landmark. Comparing the first predicted location of the landmark to the second predicted location of the landmark, and generating the correction instance is described in greater detail herein (e.g., with respect to FIGS. 2A-4).

At block 562, the system transmits, by a primary control system of the AV, the correction instance to a secondary control system of the AV. As shown in FIG. 5, the operations of blocks 552-562 are performed by a primary vehicle control system of the AV, and the operations of block 564-566 are performed by a secondary vehicle control system of the AV. Although certain operations of FIG. 5 are depicted as being performed the primary vehicle control system of the AV and the secondary vehicle control system of the AV, it should be understood that is for the sake of example and is not meant to be limiting. For example, the operations of FIG. 5 can be performed by any one of, or any combination of, the primary vehicle control system of the AV, the secondary vehicle control system of the AV, or a remote computing system.

At block 564, the system receives, by the secondary control system of the AV, the correction instance. At block 566, the system generates an additional pose instance of the AV based on the correction instance and an instance of second sensor data generated by second sensor(s) of the AV. The second sensor data can include, for example, IMU data generated by IMU(s) of the AV, wheel encoder data generated by wheel encoders of the AV, other non-vision-based sensor data generated by the AV, or any combination thereof. In some implementations, the instance of the second sensor data utilized at block 566 is temporally distinct from the second sensor data utilized to generate the pose instance utilized at block 556. Further, the instance of the second sensor data utilized at block 556 may temporally correspond to the instance of the first sensor data received at block 552.

The additional pose instance can then be transmitted back to the primary vehicle control system, and can be utilized in generating a further second predicted location of the landmark. At block 568, the system causes the AV to be controlled based on the additional pose instance. For example, the additional pose instance can be transmitted to a planning or control subsystem of the AV.

Figure 6:
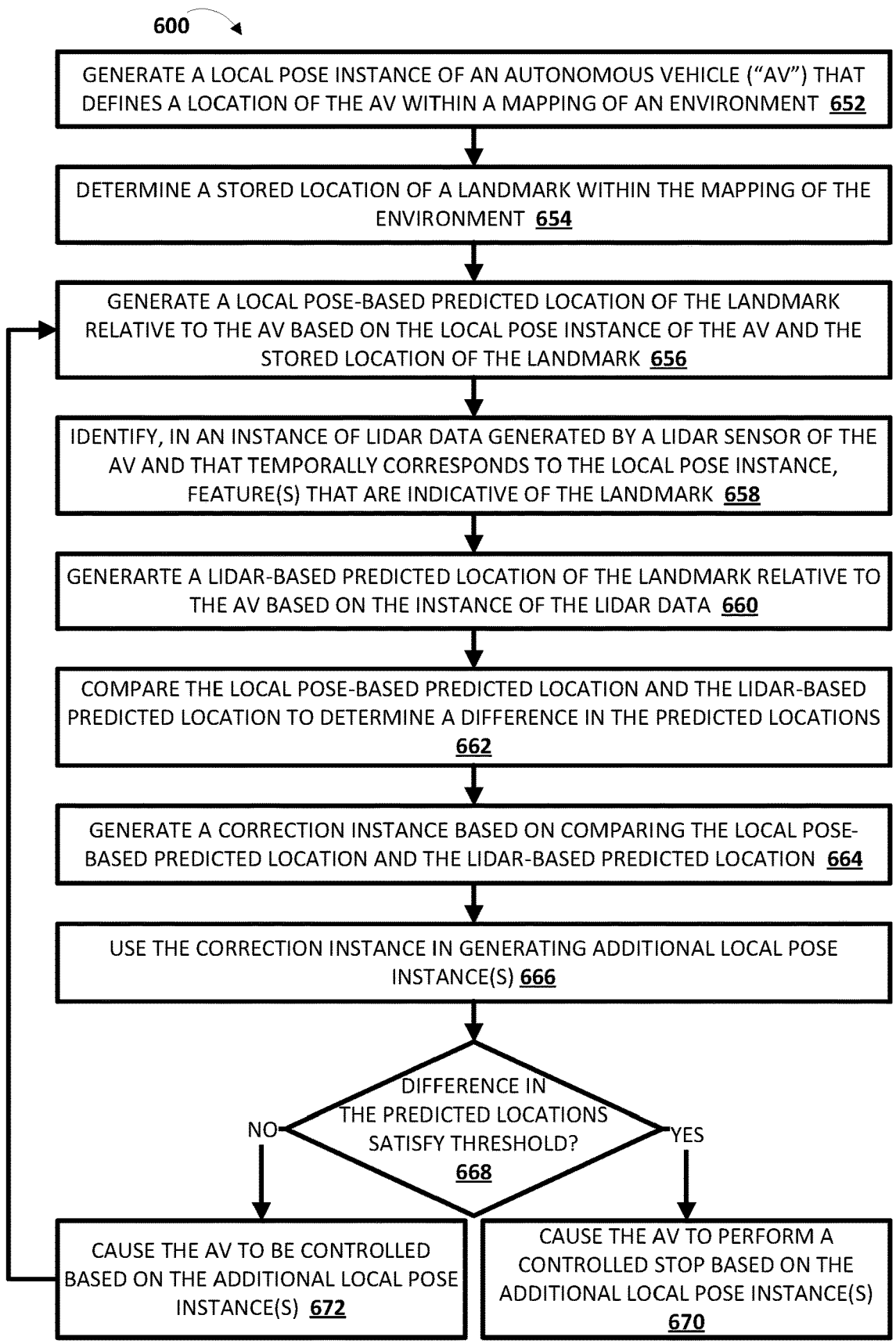
FIG. 6 is flowchart illustrating another example method for online localization of an autonomous vehicle, in accordance with various implementations.

Turning now to FIG. 6, another example method 600 for online localization of an autonomous vehicle is illustrated. The method 600 may be performed by an autonomous vehicle analyzing sensor data generated by sensor(s) of the autonomous vehicle (e.g., vehicle 100 of FIG. 1 or vehicle 400 of FIG. 4), by another vehicle (autonomous or otherwise), by another computer system that is separate from the autonomous vehicle, or various combinations thereof. For the sake of simplicity, operations of the method 600 are described herein as being performed by a system (e.g., processor(s) 122 or primary vehicle control system 120, processor(s) 172 of secondary vehicle control system 170, or any combination thereof). It will be appreciated that the operations of the method 600 may be varied, and that various operations may be performed in parallel or iteratively in some implementations, so the method 600 illustrated in FIG. 6 is merely provided for illustrative purposes.

At block 652, the system generates a pose instance of an autonomous vehicle ("AV") that defines a location of the AV within a mapping of an environment. The pose instance of the AV can define orientation information location information of the AV within a given tile. In some implementations, the pose instance of the AV can be generated based on IMU data generated by IMU(s) of the AV, wheel encoder data generated by wheel encoder(s) of the AV, other non-vision-based sensor data generated by the AV, or any combination thereof. In additional or alternative implementations, the pose instance of the AV can be generated based on LIDAR data generated by a LIDAR sensor of the AV, other vision-based based sensor data generated by the AV (e.g., image data generated by vision components of the AV, RADAR data generated by a RADAR sensor of the AV), or any combination thereof. Generating the pose instance in an online manner is described in greater detail herein (e.g., with respect to FIGS. 2A and 3). At block 654, the system determines a stored location of a landmark within the mapping of the environment. The stored location of the landmark within the mapping of the environment can include a stored point cloud that includes features of the landmark (e.g., one or more saturated regions), stored coordinates of the landmark within the mapping, other representations of the landmark, or any combination thereof.

At block 656, the system generates a pose-based predicted location of the landmark relative to the AV based on the pose instance of the AV and the stored location of the landmark. In some implementations, the pose-based predicted location can be generated based on a local pose instance of a local pose of the AV, whereas in other implementations, the pose-based predicted location can be generated based on a global pose instance of a global pose of the AV. Generating the pose-based predicted location in an online manner is described in greater detail herein (e.g., with respect to FIGS. 2A and 3). At block 658, the system identifies, in an instance of LIDAR data generated by a LIDAR sensor of the AV and that temporally corresponds to the local pose instance, feature(s) that are indicative of the landmark. The feature(s) that are indicative of the landmark can include, for example, one or more saturated regions that correspond to the landmark. Identifying the feature(s) that are indicative of the landmark is described in greater detail herein (e.g., with respect to FIG. 4). At block 660, the system generates a LIDAR-based predicted location of the landmark relative to the AV based on the instance of the LIDAR data. Generating the LIDAR-based predicted location of the landmark relative to the AV based on the instance of the LIDAR data in an online manner is described in greater detail herein (e.g., with respect to FIGS. 2A, 3, and 4).

At block 662, the system compares the pose-based predicted location and the LIDAR-based predicted location to determine a difference in the predicted locations. The system can compare the pose-based predicted location and the LIDAR-based predicted location to determine a difference between the pose-based predicted location and the LIDAR-based predicted location. At block 664, the system generates a correction instance based on comparing the pose-based predicted location and the LIDAR-based predicted location. The system can determine an offset based on the difference between the pose-based predicted location and the LIDAR-based predicted location, and can generate the correction instance based on the determined offset. Generating the correction instance based on comparing the pose-based predicted location and the LIDAR-based predicted location in an online manner is described in greater detail herein (e.g., with respect to FIGS. 2A and 3). At block 666, the system uses the correction instance in generating additional local pose instance(s). Thus, the additional local pose instance(s) are generated based on the determined offset. Notably, multiple additional pose instances can be generated based on the generated correction instance until a further correction instance is generated. The correction instance and the further correction instance can be combined, and further local pose instances can be generated based on the combined correction instance.

At block 668, the system determines whether the difference in the predicted locations of the landmark satisfies a threshold. If, at an iteration of block 668, the system determines that the difference in the predicted locations of the landmark satisfies the threshold, then the system may proceed to block 670. At block 670, the system causes the AV to perform a controlled stop based on the additional pose instance(s). Thus, the system can cause the AV to perform the controlled stop in response to determine an error in localization of the AV exceeds the threshold. If, at an iteration of block 668, the system determines that the difference in the predicted locations of the landmark does not satisfy the threshold, then the system may proceed to block 672. At block 672, the system causes the AV to be controlled based on the additional pose instance(s). Further, the system may return to block 656 to generate additional pose-based predicted location(s) of the landmark relative to the AV. Thus, the system can cause the AV to continue normal operation in response to determining that there is no error in the localization of the AV or that any determined error in the localization fails to satisfy the threshold.

Although the operations of the method 600 of FIG. 6 are depicted as occurring in particular order, it should be understood that is for the sake of example and is not meant to be limiting. For instance, the system may determine that the difference in the predicted locations of the landmark satisfies a threshold prior to generating any additional pose instances, and can perform the controlled stop based on a most recently generated local pose instance. As a result, the system can conserve computational resources in response to detecting an adverse event at the AV.

Turning now to FIG. 7, an example method 700 for offline validation of localization of a vehicle is illustrated. The method 700 may be performed by one or more computer systems that are separate from the autonomous vehicle. For the sake of simplicity, operations of the method 700 are described herein as being performed by a system (e.g., processor(s) and memory). It will be appreciated that the operations of the method 700 may be varied, and that various operations may be performed in parallel or iteratively in some implementations, so the method 700 illustrated in FIG. 7 is merely provided for illustrative purposes.

At block 752, the system obtains driving data from a past episode of locomotion of a vehicle. The driving data can be generated by the vehicle during the past episode of locomotion of the vehicle. Further, the driving data can include sensor data generated by sensors of the vehicle during the past episode of locomotion. In some implementations, the driving data can be manual driving data that is captured while a human is driving a vehicle (e.g., an AV or non-AV retrofitted with sufficient sensors (e.g., primary sensor 130 of FIG. 1)) in a real world and in a conventional mode, where the conventional mode represents the vehicle under active physical control of a human operating the vehicle. In other implementations, the driving data can be autonomous driving data that is captured while an AV is driving in a real world and in an autonomous mode, where the autonomous mode represents the AV being autonomously controlled. In yet other implementations, the driving data can be simulated driving data captured while a virtual human is driving a virtual vehicle in a simulated world.

At block 754, the system identifies, from the driving data, an instance of sensor data generated by sensor(s) of the vehicle. In some implementations, the sensor(s) of the vehicle include LIDAR sensor(s), and the instance of the sensor data generated by the LIDAR sensor(s) include an instance of LIDAR data generated by the LIDAR sensor(s). In some versions of those implementations, a global pose instance of a global pose of the vehicle can be generated based on the instance of the LIDAR data. In some additional or alternative implementations, the sensor(s) of the vehicle include IMU sensor(s), wheel encoder(s), other non-vision based sensors, or any combination thereof, and the instance of the sensor data generated by the LIDAR sensor(s) include various combinations of instances of IMU data, wheel encoder data, or other non-vision data. In some versions of those implementations, a local pose instance of a local pose of the vehicle can be generated based on the various combinations of the instances of IMU data, wheel encoder data, or other non-vision data.

At block 756, the system generates, based on the instance of the sensor data, a pose-based predicted location of a landmark in an environment of the vehicle. In implementations where the instance of the sensor data includes LIDAR data, the pose-based predicted location of the landmark can be a global pose-based predicted location of the landmark in the sense that the global pose-based predicted location of the landmark can generated based on the instance of the LIDAR data that can also be utilized in generating a global pose instance of a global pose of the vehicle. This is also referred to herein as a LIDAR-based predicted location of the landmark. The instance of the LIDAR can capture features of the landmark. For example, assume the landmark has a retroreflective surface. In this example, the retroreflective surface can cause the instance of the LIDAR data to include one or more saturated regions that correspond to the retroreflective surface of the landmark. The system can utilize location(s) corresponding to the one or more saturated regions of the landmark as the pose-based predicted location of the landmark. For instance, the one or more saturated regions can optionally be identified as part of matching the instance of the LIDAR data (or a point cloud corresponding thereto) to a previously stored mapping of the environment of the vehicle during the past episode of locomotion to generate the global pose instance. In implementations where the instance of the sensor data includes IMU data, wheel encoder data, or other non-vision based data, the pose-based predicted location of the landmark can be a local pose-based predicted location of the landmark that is generated based on the instance of the IMU data and the wheel encoder data and a previously stored mapping of the environment of the vehicle that includes the landmark.

At block 758, the system identifies, from a stored mapping of the environment of the vehicle, a stored location of the landmark in the environment of the vehicle. The stored location of the environment can also be utilized in generating the pose-based predicted location of the landmark (e.g., as indicated above with respect to the local pose-based instance at block 756). The pose-based predicted location of the landmark and the stored location of the landmark can be defined by a coordinate system of a particular frame of reference of the vehicle. For example, the pose-based predicted location of the landmark and the stored location of the landmark can be defined by coordinates with respect to a tile in which the vehicle is located or relative to the vehicle.

At block 760, the system compares the pose-based predicted location of the landmark to the stored location of the landmark, and at block 762, the system determines, based on the comparing, an error between the pose-based predicted location of the landmark and the stored location of the landmark. For example, in implementations where the pose-based predicted location is based on the instance of the LIDAR data, the system can compare a point cloud corresponding to pose-based predicted location of the landmark to an additional point cloud corresponding to the stored location of the landmark. The error can be determined based on a difference between the point clouds. As another example, in implementations where the pose-based predicted location is based on the instance of the IMU data and the wheel encoder data, the system can compare coordinates corresponding to the pose-based predicted location to coordinates corresponding to the stored location of the landmark.

At block 764, the system determines whether the error determined at block 762 satisfies an error threshold. If, at an iteration of block 764, the system determines that the error does not satisfy the error threshold, then the system may return to block 754. The error failing to satisfy the error threshold may indicate that a pose instance generated during the past episode and based on the sensor data instance is accurate. Accordingly, at a subsequent iteration of block 754, the system can identify an additional instance of the sensor data generated by the sensor(s) of the vehicle during the past episode of locomotion of the vehicle (or from a different past episode of locomotion of the vehicle or another vehicle). If, at an iteration of block 764, the system determines that the error satisfies the error threshold, then the system may proceed to block 766.

At block 766, the system adjusts parameter(s) of the sensor(s) of the vehicle. The parameter(s) of the LIDAR sensor(s) can include, for example, a point density of LIDAR points, a scan pattern of the LIDAR sensor(s), a field-of-view of the LIDAR sensor(s), a duration of a sensing cycle of the LIDAR sensor(s), one or more biases of the LIDAR sensor(s), other LIDAR parameters, or any combination thereof. The parameter(s) of the wheel encoder (s) can include, for example, an encoding type, a number of pulses per inch (or other distance), a number of pulses per shaft revolution, one or more biases of the wheel encoder(s), other wheel encoder parameters, or any combination thereof. The parameter(s) of the IMU(s) can include, for example, gyroscopic parameters of the IMU(s), accelerometer parameters of the IMU(s), a sampling frequency of the IMU(s), one or more biases of the IMU(s), other IMU parameters, or any combination thereof. Further, the adjusted parameter(s) of the sensor(s) of the vehicle can be utilized in subsequent episodes of locomotion. In some implementations, block 766 may include optional sub-block 766A. If included, at optional sub-block 766A, the system may automatically adjust the parameter(s) of the sensor(s) of the vehicle based on the error. In some additional or alternative implementations, block 766 may include optional sub-block 766B. If included, at optional sub-block 766B, the system may adjust the parameter(s) of the sensor(s) of the vehicle based on user input. Adjusting the parameter(s) of the sensor(s) of the vehicle is described in detail herein (e.g., with respect to FIG. 2B). These adjusted parameter(s) of the sensor(s) can be utilized by the vehicle (and optionally other vehicles) in subsequent episodes of locomotion.

Notably, the method 500 of FIG. 5 and the method 600 of FIG. 6 are described herein with respect to online localization of an AV, whereas the method 700 of FIG. 7 is described herein with respect to offline validation of localization of a vehicle (AV or otherwise). In other words, the method 500 of FIG. 5, the method 600 of FIG. 6, or both, may be performed by an AV during a given episode of locomotion, and the method 700 of FIG. 7 can be performed by a computing system based on driving data generated during a past episode of locomotion.

Other variations will be apparent to those of ordinary skill. Therefore, the invention lies in the claims hereinafter appended.

What is claimed is:

1. A method for localization of an autonomous vehicle (AV), the method comprising:
    generating a pose-based predicted location of a landmark relative to the AV,
        wherein generating the pose-based predicted location of the landmark relative to the AV is based on:
            a local pose instance that defines a location of the AV within a mapping of an environment, and
            a stored location of the landmark within the mapping of the environment, and
        wherein the local pose instance is generated without direct utilization of any LIDAR data from a LIDAR sensor of the AV;
    generating a LIDAR-based predicted location of the landmark relative to the AV,
        wherein generating the LIDAR-based predicted location of the landmark relative to the AV is based on identifying, in an instance of LIDAR data that temporally corresponds to the local pose instance, one or more features that are indicative of the landmark;
    generating a correction instance based on comparing the pose-based predicted location and the LIDAR-based predicted location;
    using the correction instance in generating an additional local pose instance, the additional local pose instance being generated without direct utilization of any LIDAR data from the LIDAR sensor; and
    causing the AV to be controlled based on the additional local pose instance.

2. The method of claim 1, wherein generating the pose-based predicted location of the landmark comprises:
    accessing the mapping of the environment of the AV;
    identifying the stored location of the landmark within the mapping of the environment; and
    determining, based on the local pose instance, and based on the stored location of the landmark within the mapping of the environment, the pose-based predicted location of the landmark in the environment of the AV.

3. The method of claim 1, wherein the landmark includes a retroreflective surface, and wherein the landmark is one of: a curb, a road retroreflector, a pavement marker, a lane line, an entry point of an intersection, a lane divider, a roadway sign, a traffic light, a sign post, or a building.

4. The method of claim 3, wherein one or more of the features that are indicative of the landmark include one or more saturated regions in the instance of the LIDAR data, and wherein the one or more saturated regions are caused by the retroreflective surface of the landmark.

5. The method of claim 4, wherein generating the pose-based predicted location of the landmark comprises:
    accessing the mapping of the environment of the AV;
    identifying a previously stored point cloud from the mapping of the environment that includes the stored location of the landmark within the mapping, the stored location of the landmark including a stored saturated region caused by the retroreflective surface of the landmark from previous instances of LIDAR data that include the landmark; and
    determining, based on the local pose instance, and based on the stored saturated region in the previously stored point cloud, the pose-based predicted location of the landmark in the environment of the AV.

6. The method of claim 5, wherein generating the LIDAR-based predicted location of the landmark in the environment of the AV comprises:
    assembling the instance of the LIDAR data that temporally corresponds to the local pose instance into one or more point clouds;
    identifying, in one or more of the point clouds, the one or more saturated regions caused by the retroreflective surface of the landmark; and
    determining, based on the one or more saturated regions in one or more of the point clouds, the LIDAR-based predicted location of the landmark in the environment of the AV.

7. The method of claim 6, wherein comparing the pose-based predicted location and the LIDAR-based predicted location comprises:
    determining an error in the local pose instance based on a difference between the LIDAR-based predicted location and the pose-based predicted location.

8. The method of claim 7, further comprising:
    determining whether the error satisfies an error threshold;
    in response to determining that the error in the local pose instance satisfies the error threshold, causing the AV to perform a controlled stop based on the additional local pose instance; and
    in response to determining that the error in the local pose instance does not satisfy the error threshold, causing the AV to be controlled based on the additional local pose instance.

9. The method of claim 7, wherein the difference between the LIDAR-based predicted location and the pose-based predicted location is a positional difference in n-dimensional space between the one or more saturated regions from the instance of the LIDAR data and the stored saturated region from the mapping, wherein the n-dimensional space is a 2-dimensional space or a 3-dimensional space.

10. The method of claim 9, wherein the correction instance includes an offset that is based on the difference in the n-dimensional space between the one or more saturated regions from the instance of the LIDAR data and the stored saturated region from the mapping.

11. The method of claim 1, further comprising:
determining an error in the local pose instance based on comparing the pose-based predicted location and the LIDAR-based predicted location;
determining whether the error in the local pose instance satisfies an error threshold; and
in response to determining that the error in the local pose instance satisfies the error threshold, causing the AV to perform a controlled stop based on the additional local pose instance.

12. The method of claim 1, further comprising:
identifying a historical pose-based predicted location of the landmark relative to the AV, wherein the historical pose-based predicted location was generated based on:
a previous local pose instance that defines a previous location of the AV within the mapping of the environment, and
the stored location of the landmark within the mapping of the environment;
identifying a historical LIDAR-based predicted location of the landmark relative to the AV, wherein the historical LIDAR-based predicted location was generated based on:
identifying, in a previous instance of the LIDAR data that temporally corresponds to the previous local pose instance, one or more of the features that are indicative of the landmark; and
wherein generating the correction instance is further based on comparing the local historical pose-based predicted location and the historical LIDAR-based predicted location.

13. A method for localization of an autonomous vehicle (AV), the method comprising:
by one or more primary control system processors of a primary control system:
determining a first predicted location of a landmark in an environment of the AV,
wherein determining the first predicted location of the landmark is based on a first sensor data instance of first sensor data that is generated by one or more first sensors of the AV;
determining a second predicted location of the landmark in the environment of the AV,
wherein determining the second predicted location of the landmark is based on a determined local pose instance of a local pose of the AV and a stored location, of the landmark, in a stored mapping of the environment,
wherein the determined local pose instance is generated based on a second sensor data instance of second sensor data that is generated by one or more second sensors of the AV, and
wherein the second sensor data instance used to determine the local pose instance temporally corresponds to the first sensor data instance used to determine the first predicted location of the landmark;
generating a correction instance based on comparing the first predicted location of the landmark and the second predicted location of the landmark; and
transmitting the correction instance to a secondary control system;
by one or more secondary control system processors of the secondary control system:
receiving the correction instance;
generating an additional local pose instance of the AV based on the correction instance and based on an additional second sensor data instance of the second sensor data; and
causing the AV to be controlled based on the additional local pose instance.

14. The method of claim 13, wherein the one or more first sensors include at least a LIDAR sensor, and wherein the first sensor data instance includes at least an instance of LIDAR data generated by a sensing cycle of the LIDAR sensor of the AV.

15. The method of claim 14, wherein the landmark includes a retroreflective surface, and wherein the instance of the LIDAR data includes one or more saturated regions caused by the retroreflective surface of the landmark.

16. The method of claim 15, wherein determining the first predicted location of the landmark in the environment of the AV comprises:
assembling the instance of the LIDAR data into one or more point clouds;
identifying, in one or more of the point clouds, a location in the one or more saturated regions caused by the retroreflective surface of the landmark; and
determining, based on the location of the one or more saturated regions in one or more of the point clouds, the first predicted location of the landmark in the environment of the AV.

17. The method of claim 16, wherein comparing the first predicted location of the landmark and the second predicted location of the landmark comprises:
determining a positional difference in n-dimensional space between the one or more saturated regions from the LIDAR data and the stored location of the landmark, wherein the n-dimensional space is a 2-dimensional space or a 3-dimensional space; and
determining an error in the determined local pose instance based on the positional difference in the n-dimensional space.

18. The method of claim 14, wherein determining the first predicted location of the landmark in the environment of the AV comprises:
generating a global pose instance of a global pose of the AV, wherein generating the global pose instance comprises:
assembling the instance of the LIDAR data into one or more point clouds;
aligning, using a geometric matching technique, one or more of the point clouds with a previously stored point cloud associated with the local pose instance determined based on the second sensor data instance that temporally corresponds to the first sensor data instance; and
determining, based on the global pose instance, the first predicted location of the landmark in the environment of the AV.

19. The method of claim 13, wherein the landmark includes a retroreflective surface, and wherein the landmark is one of: a curb, a pavement marker, a road retroreflector, a lane line, an entry point of an intersection, a lane divider, a roadway sign, a traffic light, a sign post, or a building.

20. A system for localization of an autonomous vehicle (AV), the system comprising:

at least one processor; and at least one memory storing instructions that are operable, when executed by the at least one processor, cause the at least one processor to:

generate a pose-based predicted location of a landmark relative to the AV,
  wherein the pose-based predicted location of the landmark relative to the AV is generated based on:
    a local pose instance that defines a location of the AV within a mapping of an environment, and
    a stored location of the landmark within the mapping of the environment, and
  wherein the local pose instance is generated without direct utilization of any LIDAR data from a LIDAR sensor of the AV;

generate a LIDAR-based predicted location of the landmark relative to the AV,
  wherein generating the LIDAR-based predicted location of the landmark relative to the AV is based on identifying, in an instance of LIDAR data that temporally corresponds to the local pose instance, one or more features that are indicative of the landmark;

generate a correction instance based on comparing the pose-based predicted location and the LIDAR-based predicted location;

using the correction instance in generating an additional local pose instance, the additional local pose instance being generated without direct utilization of any LIDAR data from the LIDAR sensor; and cause the AV to be controlled based on the additional local pose instance.

\* \* \* \* \*